(12) United States Patent
Kochi et al.

(10) Patent No.: US 7,860,273 B2
(45) Date of Patent: *Dec. 28, 2010

(54) DEVICE AND METHOD FOR POSITION MEASUREMENT

(75) Inventors: Nobuo Kochi, Tokyo (JP); Tetsuji Anai, Tokyo (JP); Hitoshi Otani, Tokyo (JP); Hirokazu Sato, Tokyo (JP)

(73) Assignee: Topcon Corporation, Tokyo (JP)

( * ) Notice: Subject to any disclaimer, the term of this patent is extended or adjusted under 35 U.S.C. 154(b) by 604 days.

This patent is subject to a terminal disclaimer.

(21) Appl. No.: 11/905,404

(22) Filed: Sep. 28, 2007

(65) Prior Publication Data

US 2008/0095402 A1    Apr. 24, 2008

(30) Foreign Application Priority Data

Sep. 29, 2006    (JP) .............................. 2006-267073

(51) Int. Cl.
*G06K 9/00* (2006.01)
*H04N 5/225* (2006.01)

(52) U.S. Cl. ..................... 382/103; 382/190; 348/218.1

(58) Field of Classification Search ................. 382/100, 382/103, 104, 106, 107, 154, 168, 181, 190–194, 382/199, 209, 232, 254, 274, 276, 286, 291–295, 382/305, 312; 396/55; 348/218.1, 188, 207.99, 348/223.1, 187, 129; 340/435

See application file for complete search history.

(56) References Cited

U.S. PATENT DOCUMENTS

| | | | | |
|---|---|---|---|---|
| 6,047,134 A | * | 4/2000 | Sekine et al. ................. | 396/55 |
| 6,961,446 B2 | * | 11/2005 | Imagawa et al. ............ | 382/103 |
| 6,985,075 B2 | | 1/2006 | Takeda | |
| 7,010,157 B2 | * | 3/2006 | Kochi et al. .................. | 382/154 |
| 7,126,630 B1 | * | 10/2006 | Lee et al. .................. | 348/218.1 |

(Continued)

FOREIGN PATENT DOCUMENTS

| | | | |
|---|---|---|---|
| EP | 1750090 A2 | * | 7/2007 |
| JP | 2003-264852 A | | 9/2003 |

OTHER PUBLICATIONS

N. Kochi, U.S. PTO Notice of Allowance and Allowability; U.S. Appl. No. 11/798,190, dated Mar. 1, 2010, 10 pages.

(Continued)

*Primary Examiner*—Seyed Azarian
(74) *Attorney, Agent, or Firm*—Foley & Lardner LLP

(57) ABSTRACT

A position measurement device is provided that can precisely measure the photographing position or posture of a photographing device or the coordinates of an object based on sequentially changing photographed images. A position measuring device 100 of the invention comprises: an image acquisition section 2 for acquiring a series of photographed images changing continuously or little by little along with position displacement relative to an object to be photographed; a positional relationship measurement section 9 for measuring position displacement and posture change of the image acquisition section 2; a feature extraction section 3 for extracting feature points from the photographed images obtained with the image acquisition section 2; a feature point tracking section 4 for tracking the feature points by searching corresponding points corresponding to the feature points on a plurality of the photographed images; an image selection section 61 for selecting an image to be processed from the series of photographed images based on a measurement result made with the positional relationship measurement section 9; and a position measurement section 7 for measuring the photographing position and the photographing posture of the image acquisition section 2 based on the image to be processed selected with the image selection section 61.

40 Claims, 21 Drawing Sheets

U.S. PATENT DOCUMENTS

| | | | |
|---|---|---|---|
| 7,181,081 B2* | 2/2007 | Sandrew | 382/254 |
| 7,193,626 B2 | 3/2007 | Otani et al. | |
| 2001/0045979 A1 | 11/2001 | Matsumoto et al. | |
| 2001/0045980 A1* | 11/2001 | Leonard | 348/129 |
| 2004/0066454 A1 | 4/2004 | Otani et al. | |
| 2007/0263924 A1 | 11/2007 | Kochi et al. | |

OTHER PUBLICATIONS

T. Anai, U.S. PTO Notice of Allowance and Allowability, U.S. Appl. No. 11/730,747, dated Feb. 19, 2010, 10 pages.

T. Anai, U.S. PTO Office Action, U.S. Appl. No. 11/567,909, dated Apr. 19, 2010, 15 pages.

H.P. Moravec, "Towards Automatic Visual Obstacle Avoidance", Robot Papers, 1977.

U.S. Appl. No. 11/567,909, filed Dec. 7, 2006, Anai et al.

U.S. Appl. No. 11/730,747, filed Apr. 3, 2007, Anai et al.

U.S. Appl. No. 11/798,190, filed May 10, 2007, Kochi et al.

S. Gibson et al., Accurate Camera Calibration for Off-line, Video-Based Augmented Reality, IEEE Proceedings of the international Symposium on Mixed and Augmented Reality, 2002, pp. 1-10.

J. Meltzer et al., Simultaneous Localization and Mapping Using Multiple View Feature Descriptors, Proceedings of IEEE/RSJ International Conference on Intelligent Robots and Systems, 2004, pp. 1550-1555.

D. Nistér et al., "Visual Odometry," Proceedings of the 2004 IEEE Computer Society Conference on Computer Vision and Pattern Recognition (CVPR'04), vol. 1, Jun. 2004, pp. 652-659.

Y. Yokochi et al., "Extrinsic Camera Parameter Estimation Based-on Feature Tracking and GPS Data," Computer Vision—ACCV 2006, Proceedings of the $7^{th}$ Asian Conference on Computer Vision, Part I (Lecture Notes in Computer Science vol. 3851), Springer Verlag, 2006, pp. 369-378.

G. Medioni et al., "Generation of a 3-D Face Model from One Camera," Pattern Recognition 2002, IEEE Computer Society $16^{th}$ International Conference, vol. 3, Aug. 11, 2002, pp. 667-671.

T. Thormählen et al. "Keyframe Selection for Camera Motion and Structure Estimation from Multiple Views," Proceedings of the ECCV 2004, 2004, pp. 523-535.

M. Pollefeys et al., "Video-to-3D," Proceedings of Photogrammetric Computer Vision 2002, 2002, pp. 1-12.

R. Koch et al., "Automatic 3D Model Acquisition from Uncalibrated Image Sequences", Computer Graphics International, Jun. 22, 1998, pp. 597-604.

T. Anai et al, U.S. PTO Office Action, U.S. Appl. No. 11/730,747, dated Jul. 8, 2009, 21 pages.

N. Kochi et al., U.S. PTO Office Action, U.S. Appl. No. 11/798,190, dated Jul. 8, 2009, 21 pages.

D. Q. Huynh, et al., "Robust Factorization for the Affine Camera: Analysis and Comparison" Seventh International Conference on Control, Automation, Robotics and Vision, Dec. 2, 2002, pp. 126-131.

T. Anai, U.S. PTO Notice of Allowance, U.S. Appl. No. 11/567,909, dated Sep. 7, 2010, 14 pages.

\* cited by examiner

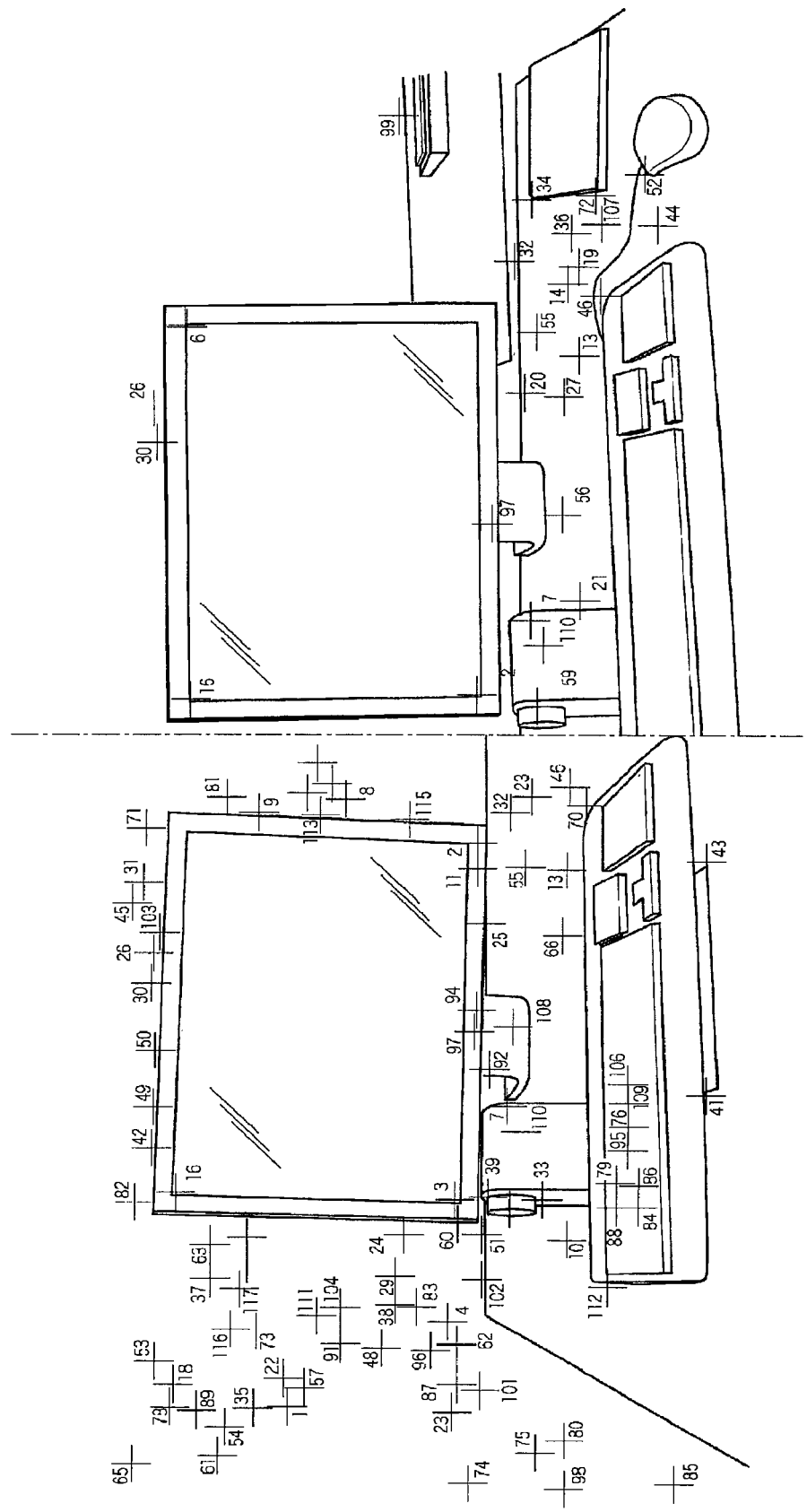

EXAMPLE IN WHICH NEW CHARACTERISTIC POINTS ARE CREATED

EXAMPLE IN WHICH NEW CHARACTERISTIC POINTS ARE NOT CREATED

**SELECTING FEATURE POINTS:
RED POINTS (FAR AND NEAR POINTS) ARE EXCLUDED**

DETERMINATION BY APPROXIMATED DISTANCES
EXCLUDING INAPPROPRIATE IMAGES:
IN THE ABOVE EXAMPLE, (2) IS EXCLUDED

FIG. 20
FEATURE POINTS
TRACKING PROCESS
1. SEARCHING ONLY IN A SPECIFIC
PART BASED ON DIRECTION
(a)          (b)
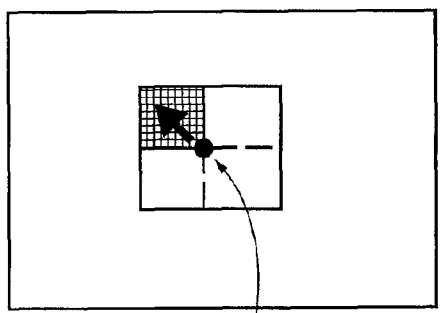 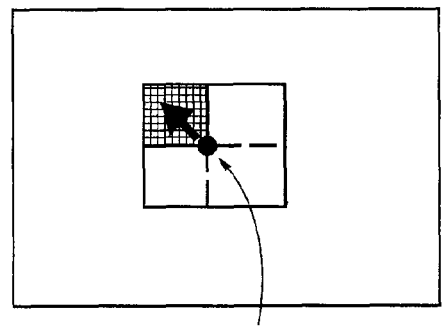
FEATURE POINT P3      P4
2. DETERMINING SEARCH RANGE BASED ON
MOTION AMOUNT AND SPEED
(c)         (d)
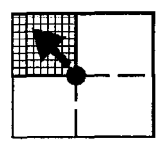 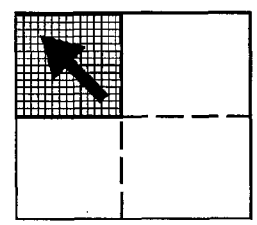

DEVICE AND METHOD FOR POSITION MEASUREMENT

BACKGROUND OF THE INVENTION

1. Technical Field

The present invention relates to a position measurement device and method. Specifically, the present invention relates to a position measurement device and method for measuring the coordinates of a photographing device or a photographed object by keeping track of a dynamic image of the object when the photographing device moves relative to the object.

2. Related Art

There is known a technique to measure the position of a photographing device by continuously photographing a photographed object while the photographing device is moving relative to the object. When the photographing device is actually mounted on a moving body such as a car to perform photographing, however, the acquired images may occasionally be far from stable and require vertical or rotational corrections frame by frame, due to the sway of the car. In some cases, moving objects such as another car, a bird flying or a leaf falling, for example, may intervene between the photographing device and the object, causing feature points to be hidden behind and restored again. Thus, there is a need to process the sway of such a photographing device and feature points that disappear and reappear. On other hand, for the case where a stationary object is photographed with a stationary photographing device, there is disclosed a 3D measurement technique to precisely and automatically search for corresponding points for measurement. (See Patent Document 1)

[Patent Document 1] Japanese Patent Application No. 2002-64094 (paragraphs [0018] to [0073], FIGS. 1 to 11, etc.)

Thus, it is required to provide a technique that can precisely measure the photographing position and posture of a photographing device or the coordinates of an object to be photographed from moving images or photographed images that sequentially change gradually or little by little, even in the case with the need to process the sway of the photographing device and the disappearance and reappearance of feature points, by developing and applying the technique to photograph a stationary object to be photographed with a stationary photographing device described above to the case where either one of them is mobile.

The object of the invention is to provide a technique that makes it possible to measure with good accuracy the position and posture of a photographing device, or coordinates of a photographed object, from an animated or moving image or from a photographed image changing little by little.

SUMMARY OF THE INVENTION

To solve the above mentioned problem, a position measuring device 100 related to aspect (1) of the present invention comprises, as shown in FIG. 2 for example, an image acquisition section 2 for acquiring a series of photographed images changing continuously or changing little by little along with position displacement relative to an object to be photographed; a positional relationship measurement section 9 for measuring position displacement and posture change of the image acquisition section 2; a feature extraction section 3 for extracting feature points from the photographed images obtained with the image acquisition section 2; a feature point tracking section 4 for tracking the feature points by searching corresponding points corresponding to the feature points on a plurality of the photographed images; an image selection section 61 for selecting an object image to be precessed from the series of photographed images based on a measurement result made with the positional relationship measurement section 9; and a position measurement section 7 for measuring the photographing position and photographing posture of the image acquisition section 2 or position of the photographed object based on the image to be processed selected with the image selection section 61.

Here, the acquisition of photographed images accompanied by relative displacement may be typically made with either one of the photographed object and the photographing section (photographing device such as a camera) moving while the other remaining still, or with both of them in motion. Further, the continuously changing photographed image means a photographed image changing continuously in terms of time or space, typically moving images continuously taken with a video camera. Here, the photographed images that change gradually refers to photographed images that sequentially change gradually or little by little in terms of time or space and hence in which the photographed object is generally common to each other. For example, images may be extracted at small time or at small number of frame intervals from moving images continuously taken for example with a video camera, or with a single camera at time points or locations successively changing little by little. Further, while the image acquisition section acquires images typically through its own photographing device (camera), images may be acquired through communication using another photographing device (including acquisition of images with a remote located position measurement device through communication with a camera mounted on a vehicle). Searching for feature points includes searching initially for feature points and sequentially for candidate corresponding points (corresponding points before determined as real corresponding points) and corresponding points corresponding thereto. Since candidate corresponding points and corresponding points may collectively be referred to as feature points in a broad sense, the term "feature points" is occasionally used in such broad sense in some expressions.

With the above constitution, positions are measured with inappropriate images excluded. Therefore, it is possible to provide a position measurement device capable of accurately measuring position and posture of a photographing device, or coordinates of a photographed object, from moving images or from photographed images successively changing little by little.

A position measuring device 100 related to aspect (2) of the present invention comprises, as shown in FIG. 2 for example, an image acquisition section 2 for acquiring a series of photographed images changing continuously or changing little by little along with position displacement relative to an object to be photographed; a positional relationship measurement section 9 for measuring displacement and posture change of the image acquisition section 2; a feature extraction section 3 for extracting feature points from the photographed images obtained with the image acquisition section; a feature point tracking section 4 for tracking the feature points by searching corresponding points corresponding to the feature points on a plurality of the photographed images; a feature point selection section 62 for selecting feature points to be processed from the feature points extracted from the photographed images based on a measurement result made with the positional relationship measurement section 9; and a position measurement section for measuring the photographing position and photographing posture of the image acquisition section 2 or position of the photographed object based on the image to be processed selected with the image selection section 62.

With the above constitution, positions are measured while excluding inappropriate feature points. Therefore, it is possible to provide a position measurement device capable of accurately measuring position and posture of a photographing device, or coordinates of a photographed object, from moving images or from photographed images successively changing little by little.

A position measuring device related to aspect (3) of the present invention comprises, as shown in FIG. 2 for example, an image acquisition section 2 for acquiring a series of photographed images changing continuously or changing little by little along with position displacement relative to an object to be photographed; a positional relationship measurement section 9 for measuring position displacement and posture change of the image acquisition section; a feature extraction section 3 for extracting feature points from the photographed images obtained with the image acquisition section 2; a feature point tracking section 4 for tracking the feature points by searching corresponding points corresponding to the feature points on a plurality of the photographed images; an image selection section 61 for selecting image to be processed from the series of photographed images based on a measurement result made with the positional relationship measurement section 9; and a position measurement section 7 for measuring the photographing position and photographing posture of the image acquisition section 2 or position of the photographed object based on the image to be processed selected with the image selection section.

With the above constitution, positions are measured while excluding inappropriate images. Therefore, it is possible to provide a position measurement device capable of accurately measuring position and posture of a photographing device, or coordinates of a photographed object, from moving images or from photographed images successively changing little by little.

A position measuring device related to aspect (4) of the present invention comprises, as shown in FIG. 2 for example, an image acquisition section 2 for acquiring a series of photographed images changing continuously or changing little by little along with position displacement relative to an object to be photographed; a positional relationship measurement section 9 for measuring position displacement and posture change of the object to be photographed; a feature extraction section 3 for extracting feature points from the photographed images obtained with the image acquisition section 2; a feature point tracking section 4 for tracking the feature points by searching corresponding points corresponding to the feature points on a plurality of the photographed images; a feature point selection section 62 for selecting processing feature point to be processed from the photographed images based on a measurement result made with the positional relationship measurement section 9; and a position measurement section 7 for measuring the photographing position and photographing posture of the image acquisition section 2 or position of the photographed object based on the feature point to be processed selected with the feature point selection section 62.

With the above constitution, positions are measured while excluding inappropriate feature points. Therefore, it is possible to provide a position measurement device capable of accurately measuring position and posture of a photographing device, or coordinates of a photographed object, from moving images or from photographed images successively changing little by little.

The invention related to aspect (5) of the present invention is the position measuring device related to aspect (1) or (3) of the present invention, wherein the image selection section 61 selects the image to be processed based on the measurement data on the displacement direction and/or displacement amount obtained with the positional relationship measurement section 9. The above constitution makes it possible to make position measurement using images having the same displacement direction and/or displacement amount and improve position accuracy. Here, "displacement direction and/or displacement amount" means at least one of them.

The invention related to aspect (6) of the present invention is the position measuring device related to aspect (2) or (4) of the present invention, as shown in FIG. 7 or FIG. 8 for example, wherein the feature point selection section 62 selects feature points, with their displacement direction and displacement amount obtained from tracking data with the feature point tracking section 4 falling within a specified range including the displacement direction and displacement amount obtained with the positional relationship measurement section 9, as the object points to be processed. Here, "within a specified range" means a range in which sufficient accuracy in position measurement is obtained typically by stereo method. The range may be chosen for example ±10% or ±10 degrees. Constituting in this way makes it possible to make position measurement using feature points having the same displacement vector, and improve position accuracy.

The invention related to aspect (7) of the present invention is the position measuring device related to aspect (2) or (4) of the present invention, as shown in FIG. 9 for example, wherein the feature point selection section 62 selects feature points, with the approximate distance between the image acquisition section 2 and the feature point determined from measurement data obtained with the positional relationship measurement section 9 falling within a specified range, as the feature points to be processed. Here, "within a specified range" means a range in which sufficient accuracy in position measurement is obtained typically by stereo method. The range may be chosen for example ±10%. Constituting in this way makes it possible to make position measurement using feature points in the same distance from the photographing device, and improve position accuracy.

The invention related to aspect (8) of the present invention is the position measuring device related to aspect (6) or (7) of the present invention, comprising an image selection section 61 for selecting images to be processed from the series of photographed images based on a measurement result made with the positional relationship measurement section 9, wherein the image selection section 61 selects an image having relatively many feature points to be processed, as the image to be processed. Here, "including relatively many" means "many" in comparison with photographed images of neighborhood. Constituting in this way makes it possible to make position measurement using images having many feature points in the same distance from the photographing device or feature points of the same displacement vector, and improve position accuracy.

The invention related to aspect (9) of the present invention is the position measuring device related to aspect (5) of the present invention, as shown in FIG. 13 or FIG. 14 for example, wherein the image selection section 61 selects the images to be processed between photographed image acquisition with the image acquisition section 2 and feature point extraction with the feature extraction section 3. Constituting in this way makes it possible to exclude inappropriate photographed images in an early stage and improve the efficiency of processing position measurements.

The invention related to aspect (10) of the present invention is the position measuring device related to aspect (6) of the present invention, as shown in FIG. 7 or FIG. 8 for example, wherein the feature point selection section 62 selects the feature points to be processed during feature point tracking with the feature point tracking section 4, or between feature point tracking with the feature point tracking section 4 and position measurement with the position measurement section 7. Here, "while the feature points are being tracked" is meant in the sense that real time process is possible if both steps of feature point tracking and image selection are finished or the step of feature point selection is finished within a period of time from the time of extracting the feature point of a photographed image to the time of acquiring the next photographed image. With the above constitution, real time processing is suitably made if the feature point to be processed is selected while the feature point is being tracked. If the feature point to be processed is selected after tracking the feature point, position accuracy is enhanced.

The invention related to aspect (11) of the present invention is the position measuring device related to aspect (7) of the present invention, as shown in FIG. 9 for example, wherein the feature point selection section 62 selects the feature points to be processed either during feature point tracking with the feature point tracking section 4, between feature point extraction with the feature extraction section 3 and feature point tracking with the feature point tracking section 4, or between feature point tracking with the feature point tracking section 4 and position measurement with the position measurement section 7. With the above constitution, real time processing is preferably made if the feature point to be processed is selected before or while the feature point is being tracked. If the feature point to be processed is selected after tracking the feature point, position accuracy is enhanced.

The invention related to aspect (12) of the present invention is the position measuring device related to any one of the aspects (1) to (11) of the present invention, wherein the positional relationship measurement section 9 includes a gyroscope, an accelerometer, and a geomagnetism sensor. Constituting in this way makes it possible to measure direction and amount of displacement accurately.

The invention related to aspect (13) of the present invention is the position measuring device related to any one of the aspects (1) to (12) of the present invention, as shown in FIG. 20 for example, wherein the feature point tracking section 4, when tracking feature points, is capable of changing search width direction or search width size. The above constitution helps reduce the process time for tracking the feature point and permits processing in real time.

The invention related to aspect (14) of the present invention is the position measuring device related to any one of the aspects (1) to (13) of the present invention, as shown in FIG. 2 for example, comprising a display section 10 for displaying on a screen displacement direction and displacement speed of feature points on the photographed image from a result of tracking made with the feature point tracking section 4. The above constitution permits the operator to select images to be processed and feature points to be processed while confirming them on the display section.

The invention related to aspect (15) of the present invention is the position measuring device related to any one of the aspects (1) to (14) of the present invention, as shown in FIG. 2 for example, comprising a comparing section 8 for comparing the information on the photographing position and photographing posture measured with the position measurement section 7 with the information on the photographing position and photographing posture obtained with the positional relationship measurement section 9, or for comparing the information on the position of the photographed object measured with the position measurement section with the information on the position of the photographed object obtained with the positional relationship measurement section. This constitution makes it possible to correct measured position using comparative data and improve position accuracy.

To solve the above mentioned problem, a position measuring method related to aspect (16) of the present invention comprises, as shown in FIG. 3 for example, an image acquisition step S10, with an image acquisition section, of acquiring a series of photographed images changing continuously or changing little by little along with position displacement relative to an object to be photographed; a positional relationship measurement step S90 of measuring position displacement and posture change of the image acquisition section 2; a feature extracting step S11 of extracting feature points from photographed images obtained in the image acquisition step S10; a feature point tracking step S12 of tracking the feature points by searching corresponding points corresponding to the feature points on a plurality of the photographed images; a image selection step S20A of selecting images to be processed from the series of photographed images based on a measurement result made with the positional relationship measurement step 90; and a position measurement step S30 of measuring the photographing position and photographing posture of the image acquisition section 2 or position of the photographed object based on the images to be processed selected in the image selection step S20A.

With the above constitution, positions are measured while excluding inappropriate feature points. Therefore, it is possible to provide a position measurement device capable of accurately measuring position and posture of a photographing device, or coordinates of a photographed object, from moving images or from photographed images successively changing little by little.

A position measuring method related to aspect (17) of the present invention comprises, as shown in FIG. 3 for example, an image acquisition step S10, with an image acquisition section 2, of acquiring a series of photographed images changing continuously or little by little along with position displacement relative to an object to be photographed; a positional relationship measurement step S90 of measuring position displacement and posture change of the image acquisition section 2; a feature extraction step S11 of extracting feature points from photographed images obtained in the image acquisition step S10; a feature point tracking step S12 of tracking the feature points by searching corresponding points corresponding to the feature points on a plurality of the photographed images; a feature point selection step S20B of selecting feature points to be processed from the feature points extracted from the photographed images based on a measurement result made in the positional relationship measurement step S90; and a position measurement step S30 of measuring the photographing position and photographing posture of the image acquisition section 2 based on the feature points to be processed selected in the feature point selection step S20B.

With the above constitution, as positions are measured while excluding inappropriate images, it is possible to provide a position measuring method that permits to measure position and posture of a photographing device or coordinates of a photographed object from moving images or photographed images successively changing little by little.

A position measuring method related to aspect (18) of the present invention comprises, as shown in FIG. 3 for example, an image acquisition step S10 of acquiring a series of photographed images changing continuously or little by little along with position displacement relative to an object to be photographed; a positional relationship measurement step S90 of measuring position displacement and posture change of the object to be photographed; a feature extraction step S11 of extracting feature points from the photographed images obtained in the image acquisition step S10; a feature point tracking step S12 of tracking the feature points by searching corresponding points corresponding to the feature points on a plurality of the photographed images; an image selection step S20A of selecting images to be processed from the series of photographed images based on a measurement result made in the positional relationship measurement step S90; and a position measurement step S30 of measuring the photographing position and the photographing posture of the image acquisition section 2 or the position of the photographed object based on the images to be processed selected in the image selection step S20A.

With the above constitution, positions are measured while excluding inappropriate feature points. Therefore, it is possible to provide a position measurement device capable of accurately measuring position and posture of a photographing device, or coordinates of a photographed object, from moving images or from photographed images successively changing little by little.

A position measuring method related to aspect (19) of the present invention comprises, as shown in FIG. 3 for example, an image acquisition step S10 of acquiring a series of photographed images changing continuously or little by little along with position displacement relative to an object to be photographed; a positional relationship measurement step S90 of measuring position displacement and posture change of the object to be photographed; a feature extraction step S11 of extracting feature points from the photographed images obtained in the image acquisition step S10; a feature point tracking step S12 of tracking the feature points by searching corresponding points corresponding to the features points on a plurality of the photographed images; a feature point selection step S20B of selecting feature points to be processed from the feature points extracted from the photographed images based on a measurement result made in the positional relationship measurement step S90; and a position measurement step S30 of measuring the photographing position and photographing posture of the image acquisition section 2 or the position of the photographed object based on the feature points to be processed selected in the feature point selection step S20B.

With the above constitution, positions are measured while excluding inappropriate images. Therefore, it is possible to provide a position measurement device capable of accurately measuring position and posture of a photographing device, or coordinates of a photographed object, from moving images or from photographed images successively changing little by little.

This invention makes it possible to provide a technique capable of accurately measuring the photographing position and posture of a photographing device, or coordinates of a photographed object, from moving images or from photographed images changing little by little.

This application is based on the Patent Applications No. 2006-267073 filed on Sep. 29, 2006 in Japan, the contents of which are hereby incorporated in its entirety by reference into the present application, as part thereof.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

BRIEF DESCRIPTION OF THE DRAWINGS

FIG. 5 shows exemplary corresponding point matching.

FIG. 20 is a drawing for explaining a high speed feature point tracking process.

DETAILED DESCRIPTION OF THE PREFERRED EMBODIMENT

The embodiments of the present invention are hereinafter described with reference to the drawings.

First Embodiment

Figure 1:
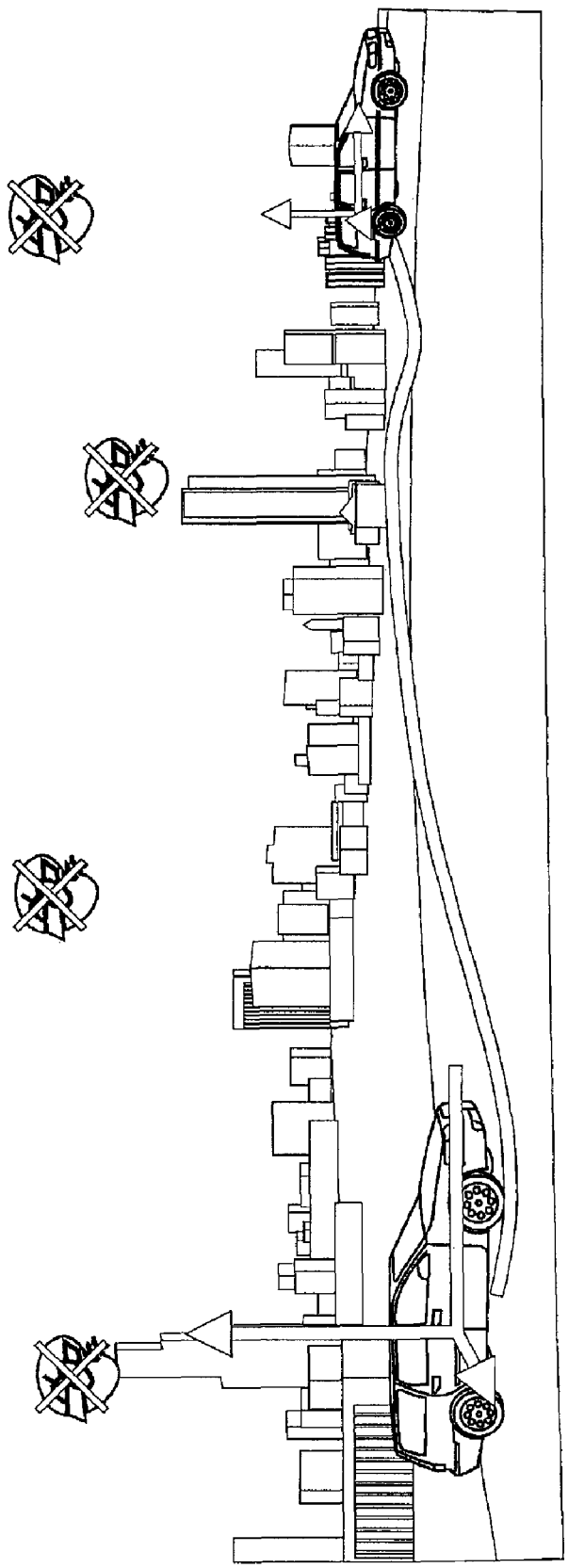
FIG. 1 is an explanatory view of the concept of the present invention.

FIG. 1 is a view for explaining the concept of this embodiment. In this example, a camera is mounted on a car to photograph the scene of a street as an object to be photographed while gradually changing the position of the car, and the positional coordinates of the camera, or the tracks of the car, are obtained from the results of tracking using a plurality of the photographed images. Alternatively, a tracking process may also be made by continuously photographing the object and extracting images at appropriate frame intervals. This technique enables car navigation systems to continuously display the position of the car, and more importantly complements such systems in areas where GPS radio waves cannot be received. Feature points that are moving or fluctuating greatly are not suitable for use to obtain the positional coordinates of the camera, and thus are removed.

The first embodiment is described as an example in which a positional relationship measurement section having an inertia sensor is mounted, together with a photographing device, on a vehicle. Explanation is also made on an example of selecting feature points to be processed in the feature point selection section after tracking feature points using the feature point tracking section. While this embodiment is presented as an example of using the vehicle for mounting the photographing device and the inertia sensor on, the vehicle may be replaced with a moving body such as ships and airplanes. It is also possible to mount an inertia sensor on a portable video camera, CCD camera, or mobile phone camera, to make position estimation and 3D measurements.

Figure 2:
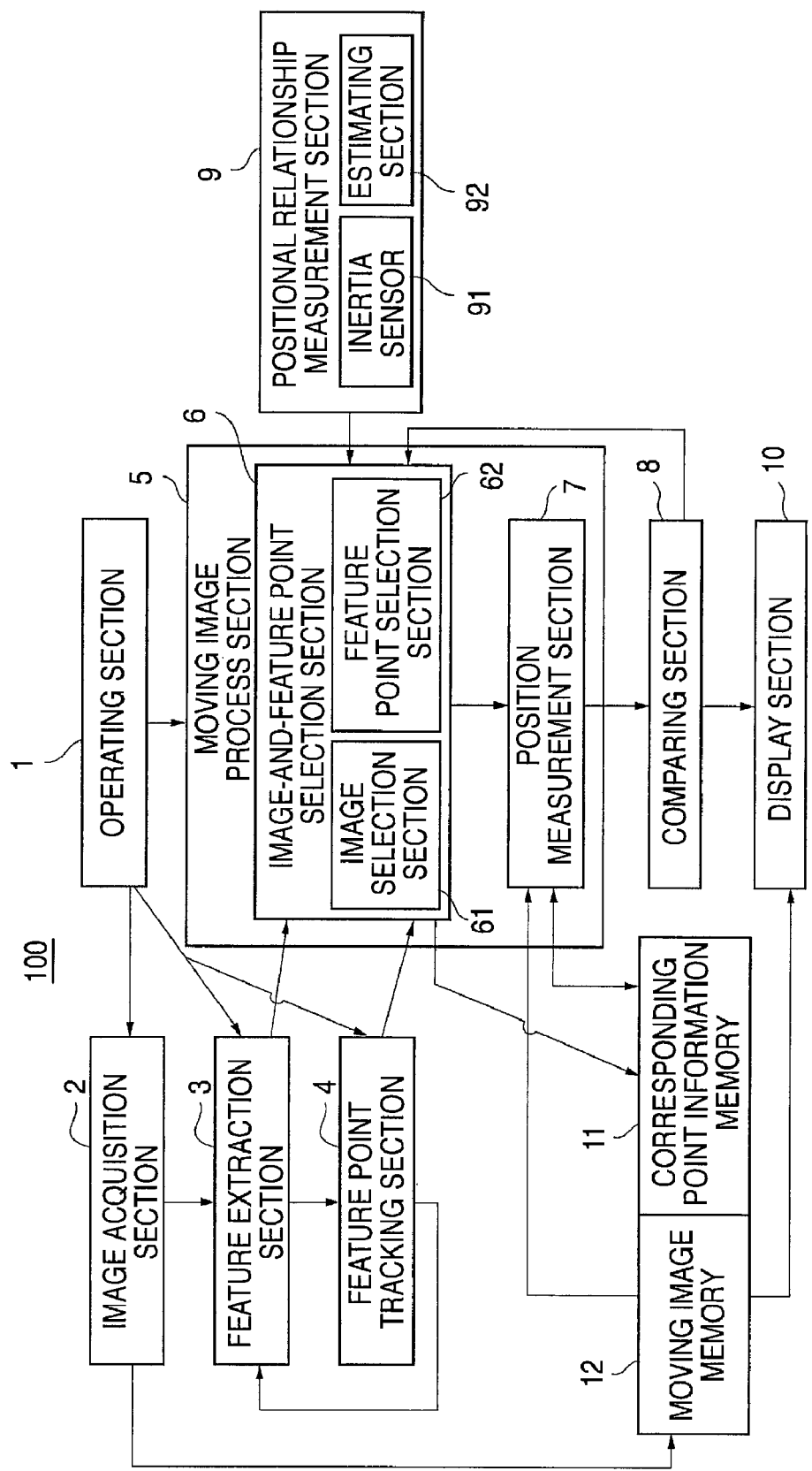
FIG. 2 is a block diagram of an example constitution of a position measuring device as a first embodiment of the invention.

FIG. 2 shows an exemplary configuration of a position measurement device 100 in this embodiment. In this drawing, reference numeral 1 denotes an operation section for controlling various sections of the position measurement device 100 to enable it to function as a position measurement device. Specifically, the operation section 1 commands a photographed image acquisition section 2 to start and stop photographing, a feature extraction section 3 to change its settings, a feature point tracking section 4 to change its settings and to start and stop, a moving image process section 5 to start selecting and to determine orientation, etc. Besides, concerning instructions to the moving image process section 5 for starting selection and execution of orientation, it may also be adapted to start the process automatically once the image acquisition section 2 acquires a specified number of images.

Reference numeral 2 denotes an image acquisition section for sequentially acquiring photographed images such as moving images. Besides acquiring photographed images, the image acquisition section 2 sends an output to the feature extraction section 3, saves the photographed images in a moving image memory 12, etc. The photographed image acquisition section 2 may not perform photographing to acquire images, but may acquire images from other photographing devices through communication with them.

Reference numeral 3 denotes a feature extraction section for extracting feature points from the sequentially acquired photographed images which differ slightly from each other. The feature extraction section 3 extracts feature points from the photographed images input from the photographed image acquisition section 2, outputs the extracted feature points to the feature point tracking section 4 and the moving image process section 5, etc.

Reference numeral 4 denotes a feature point tracking section for searching for candidate corresponding points corresponding to the feature points input from the feature extraction section 3 to keep track of the feature points. Besides the tracking process, the feature point tracking section 4 outputs the tracking results to the moving image process section 5, commands the moving image process section 5 to start execution and to judge the arrangement of the candidate corresponding points, commands the feature extraction section 3 to establish new feature points, etc.

Reference numeral 9 denotes a positional relationship measurement section for measuring photographing position and photographing posture using an inertia sensor 91 to supply measured data to the moving image process section 5, and having an inertia sensor 91 and an estimating section 92. The inertia sensor 91 is made up of such components as gyroscope (angular acceleration sensor), accelerometer, and geomagnetic sensor, to measure position and sense of the photographing device by inertia measurement. The combination of the above sensors is not limited to the above and there may be many other combinations. The estimating section 92 is made of a Karman filter for example, to make it possible to improve inertia measurement accuracy and carry out estimation calculation of posture, direction, and position of the photographing device using the inertia measurement data. The gyroscope may either be of mechanical type utilizing the Coriolis force (rotary type, vibratory type), fluid type (gas type), optical type using Sagnac effect (ring laser gyroscope, optical fiber gyroscope), or MEMS (Micro-electro-mechanical systems) type of small size and light weight. The accelerometer detects acceleration of a moving body and calculates, from the detection, displacement speed and displacement distance of the photographing device (camera). As the accelerometer, a piezoelectric three-axis accelerometer and a servo-accelerometer, for example, may be used.

Reference numeral 5 denotes a moving image process section having an image-and-feature point selection section 6 and a position measurement section 7. The image-and-feature point selection section 6 selects images to be processed and feature points to be processed, based on the measurement results with the positional relationship measurement section 9, for the feature points obtained from a series of images photographed with the image acquisition section 2 and the feature points obtained at the feature extraction section 3, and for the feature points obtained from the results of tracking with the feature point tracking section 4, determines a stereo image suitable for position measurement, and supplies it to the position measurement section 7.

The image-and-feature point selection section 6 has an image selection section 61 and a feature point selection section 62. The image selection section 61 selects an image to be processed from a series of photographed images on the basis of the results measured with the positional relationship measurement section 9. For example, it eliminates images that are motionless or abnormal, or have few feature points to be processed. The feature point selection section 62, based on the results measured with the positional relationship measurement section 9, eliminates feature points inappropriate for position measurement, from the feature points extracted from the photographed images, and selects feature points to be processed. For example, a feature point is selected that is within a specified range of distance from the camera or that follows well the motion of the camera.

Reference numeral 7 denotes a position measurement section for implementing orientation calculation and 3D measurement using images and feature points selected with the image-and-feature point selection section 6. Besides, the position measurement section 7 implements acquisition of photographed images from the moving image memory 12, acquisition of candidate corresponding point information from the corresponding point information memory 11, outputting orientation results and 3D measurement results to the display section 10, reflection to the corresponding point information memory 11, and outputting orientation results and 3D measurement results to the comparing section 8 and to the display section 10.

Reference numeral 8 denotes a comparing section for comparing the information on the position of photographed object or the information on the photographing position and photographing posture measured with the position measurement-section 7 with the information on the position of the photographed object or the information on the photographing position and photographing posture obtained with the positional relationship measurement section 9 (external orientation elements, tilt or posture of three axes, 3D position). This makes it possible to correct the measurements taken with the position measurement section 7 and to improve measurement accuracy. The comparing section 8 also compares the data on tilt and positions of feature points and images obtained in the process of moving image analysis or in the process of image acquisition, feature point extraction, and feature point tracking with the information on the photographing position and posture obtained with the positional relationship measurement section 9, and provides these comparison data to the image-and-feature point selection section 6. The image-and-feature point selection section 6, based on these comparison data, excludes images and feature points that are inappropriate for position measurement, or that show no change in position although the photographing position is in motion, and images and feature points that make motion different from the motion of other images and feature points present around them.

Reference numeral 10 denotes a display section for displaying images of photographed objects measured in three dimension measurement or orientation-processed with the moving image process section, and is also capable of displaying direction and speed of motion. Reference numeral 11 denotes a corresponding point information memory for storing information on feature points and their corresponding points (including candidate corresponding points). A moving image memory 12 stores photographed images.

Figure 3:
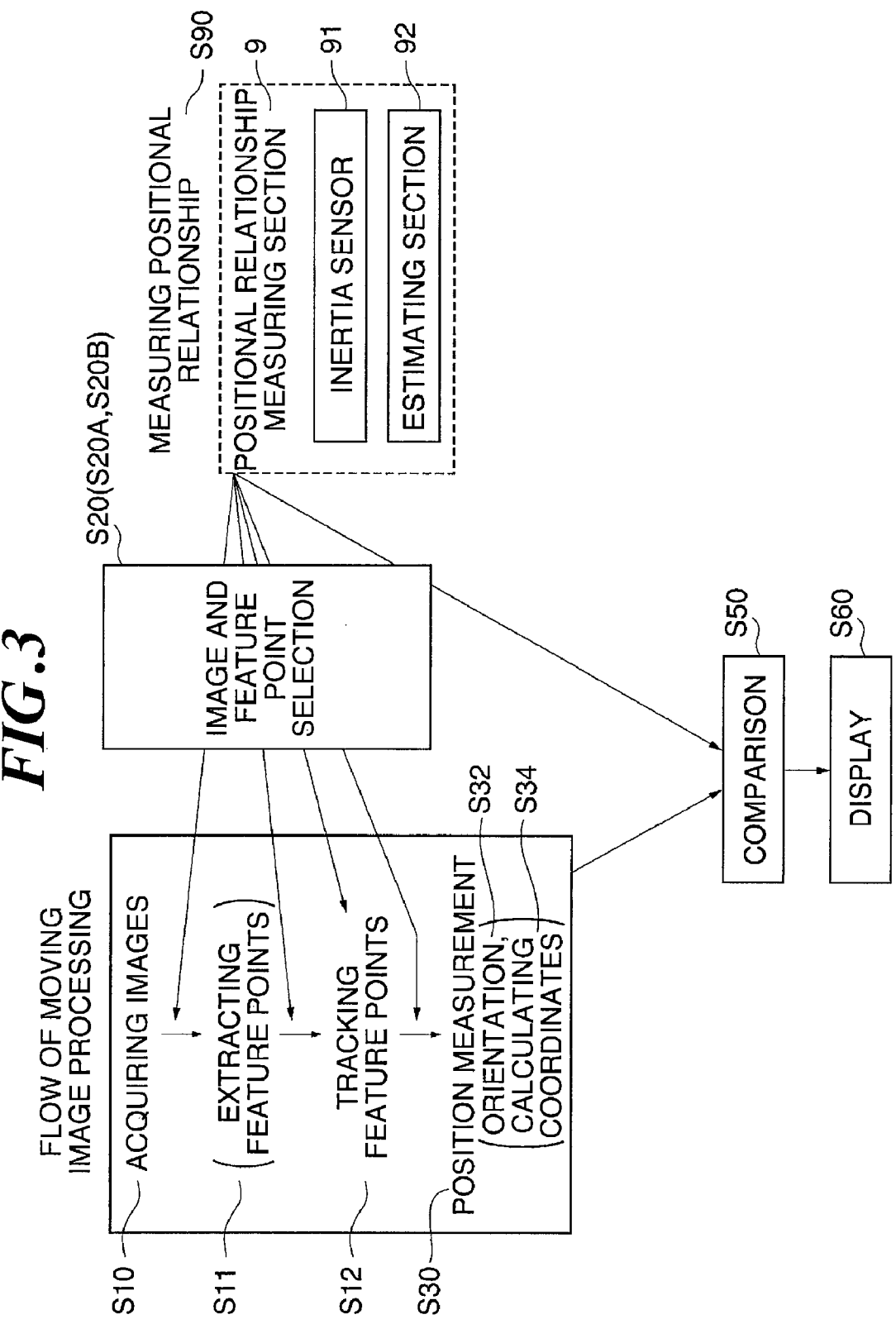
FIG. 3 shows an example flow of a position measuring method in the first embodiment.

FIG. 3 is an exemplary flowchart of a position measurement method in the first embodiment. For constitution, refer to FIG. 2. First, the image acquisition section 2 acquires photographed images (S10). Typically the image acquisition section 2 has its own photographing device (camera) and acquires photographed images. While it is also possible to have photographed images transmitted from other photographing device for acquisition, this embodiment is assumed to take images with its own camera. After acquiring images (S10), the feature extraction section 3 extracts feature points (S11) and the feature point tracking section 4 tracks feature points (S12). An object is photographed while gradually changing the position of a moving body such as a car, and the acquired successive images are automatically sequentially correlated with respect to feature points to extract corresponding points. Continued tracking finally determines the corresponding points. Next, in the image-and-feature point selection section 6, feature points and images suitable for 3D measurement are selected (S20) and a pair of stereo images having a sufficient base line length is determined.

On the other hand, in the positional relationship measurement section 9, displacement and posture change of the camera of the image acquisition section 2 are measured, and the measured data are supplied to the moving image process section 5 (S90). The moving image process section 5, based on the above measured data, selects images to be processed or feature points to be processed using the image-and-feature point selection section 6 (S20): selecting images to be processed (S20A) and selecting feature points to be processed (S20B)). The above steps are carried out in various stages; before, after, and in the middle of image acquisition (S10), feature point extraction (S11), and feature point tracking (S12). According to this embodiment, feature point tracking is followed by the selection of feature points and images. Then, the position measurement section 7 measures positions using images to be processed and feature points to be processed selected in the image-and-feature point selection section 6 (S30). In other words, relative orientation is carried out (S32), and position coordinates, posture, and 3D coordinates of the camera are obtained (S34).

In the comparing section 8, the information on the photographing position and photographing posture or the information on the position of the photographed object obtained with the position measurement section 7 is compared with the information on the photographing position and photographing posture or the information on the position of the photographed object obtained with the positional relationship measurement section 9 (S50) to contribute to improving the accuracy of position measurement data. The comparing section 8 compares the information on the position of the feature point and the tilt of the photographed image obtained in the image acquisition (S10), feature point extraction (S11), and feature point tracking (S12) with the information on the photographing position and posture of the camera obtained with the positional relationship measurement section 9 to contribute to selecting the images and feature points (S20). The display section 10, using characters, graphs, and images, displays the position information and posture information obtained in the image acquisition (S10), feature point extraction (S11), feature point tracking (S12), image-and-feature point selecting (S20), and position measurement (S30) and the position information and posture information obtained with the positional relationship measurement section 9. For example, out of the tracking results by the feature point tracking section, displacement direction and displacement speed of the feature point on the photographed image are displayed on the screen together with the displacement direction of the camera (direction of the gyroscope) measured with the positional relationship measurement section 9.

[Moving Image Analysis]

Figure 4:
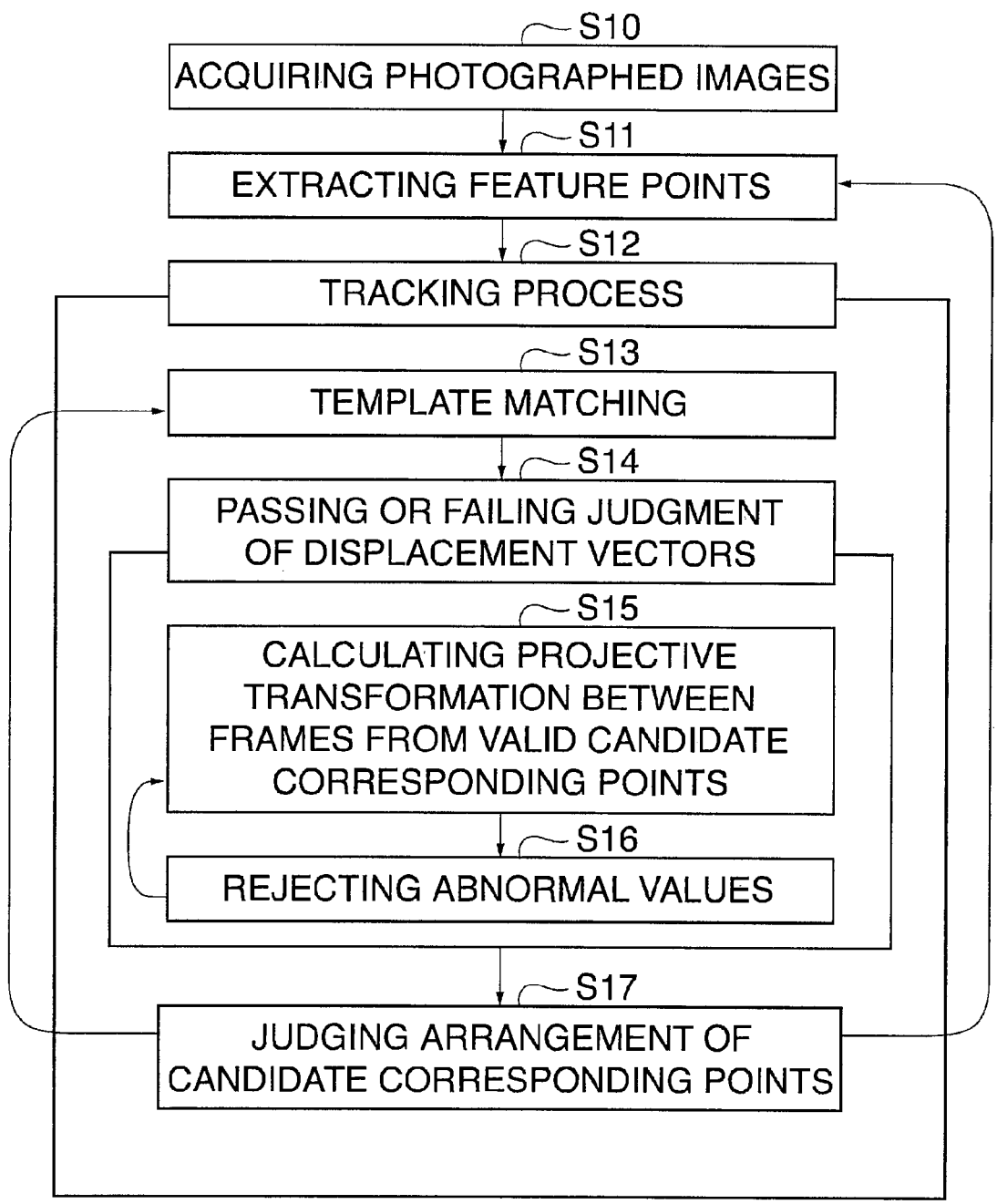
FIG. 4 is an exemplary flowchart of tracking feature points.

FIG. 4 shows an example flow of moving image analysis or the flow of image acquisition, feature point extraction, and feature point tracking. The example flow shown here is the process flow in real time. The moving image analysis sequentially processes a moving image, and photographed images that change gradually. First, the image acquisition section 2 acquires photographed images. As for the extent of change in successively photographed images changing little by little, the smaller the change, the higher can be made the accuracy of feature point tracking; however, as the moving image processing takes time, it is preferable to determine the extent within an appropriate range based on experience. For example, photographed images are acquired at intervals of 0.01 to 10 seconds. The operation section 1 sequentially sends photographed images that change gradually, out of the acquired photographed images, to the feature extraction section 3. In this embodiment, a photographing device is mounted on a car, and performs photographing while the car travels. Thus, the term "photographed images that change gradually" refers to photographed images that change gradually in terms of time or space and hence in which the photographed object is generally common between the images next to each other. The feature extraction section 3 extracts feature points from each photographed image (S11). Besides, noise is removed and feature points are selected.

Next, the feature point tracking section 4 performs a tracking process for each feature point selected in the feature extraction process (S12). That is, the feature point tracking section 4 obtains candidate corresponding points corresponding to the feature points, obtains the movement vectors of the feature points and the screen relative movement amount, and in addition, links these to obtain the movement tracks. The term "screen relative movement amount" refers to the amount of relative movement on the screen between the photographing device and the object to be photographed (which includes feature points). The term "movement vectors" refers to vectors of relative movement of respective feature points on 2D photographed images. When tracking the feature points, first, template matching is performed for successive photographed images (S13) to obtain candidate corresponding points corresponding to the feature points. In this way, the movement vectors of the respective feature points can be obtained. It is also judged whether the movement vectors are passing or failing (S14). That is, by using successive photographed images to perform a projective transformation (S15), the screen relative movement amount with respect to the photographing device can be obtained. Then, the movement vectors of the respective feature points are compared with the screen relative movement amount between frames to judge whether the movement vectors are passing or failing (S14). Candidate corresponding points that show abnormal movement and hence can be considered as showing erroneous correspondence are deleted (S16). Repeating the processes S15 and S16 improves the accuracy of the projective transformation.

Next, a judgment is made as to the arrangement of the candidate corresponding points (S17). That is, the arrangement of the feature points and the candidate corresponding points on the photographed images is checked. In the case where the arrangement of the feature points is so deviated as to create a vacant area, the feature extraction section 3 is commanded to establish points existing in the newly created vacant area as new feature points. Then, the process returns to the feature point extraction (S11) to repeat the feature point extraction (S11) and the tracking process (S12) sequentially for new successive images in real time. If the feature point extraction has been finished for a sequence of photographed images, the process returns to the template matching (S13) to perform a collective tracking process (S12) sequentially for new successive images.

[Feature Point Extraction]

The feature point extraction (S11) is performed in the feature extraction section 3. Typically, feature points are extracted from the entire screen in the initial frame, and from an area of the screen that is not overlapped with that in the initial frame in subsequent frames. In this embodiment, the extraction of feature points in the initial frame may appropriately employ, for example, a MORAVEC operator (H. P. Moravec. Towards Automatic Visual Obstacle Avoidance. Proc. 5th International Joint Conference on Artificial Intelligence, pp. 584, 1977.), or other operators such as Hariss, Pressy and Susan.

The feature extraction operators have a problem of being too sensitive to slight noise on images (such as noise on the edges), whichever feature extraction operator may be utilized. In order to improve this property, a noise removal process is performed using a noise filter such as an average filter before using the feature extraction operator.

Even if the noise removing process is done, however, feature points may concentrate on a certain part on the image (such as a tree or a lawn) and hence may adversely affect the template matching to be described later, depending on the object to be photographed. To avoid this situation, a point selection process is performed. The point selection process may use such a technique as to limit the distance between respective feature points. In the case where the maximum number of feature points is specified beforehand, the distance between the feature points on the assumption that they were arranged uniformly over the entire image is obtained, and the feature points are arranged so as to keep at least the obtained distance. Arranging the feature points uniformly over the entire image in this way will ensure the determination of relative orientation.

[Tracking Process]

The feature point tracking section 4 performs a tracking process for each feature point selected in the feature extraction process (S12). That is, candidate feature points are obtained corresponding to the feature points, the movement vectors of the feature points and the screen relative movement amount are obtained, and in addition, these are linked to obtain the movement tracks.

[Template Matching]

In this embodiment, the template matching is used to keep track of the feature points (S13). Successive images are sequentially selected as stereo pairs from the acquired photographed images. The selected images are subjected to stereo matching, for example in an SSDA method (successive similarity detection algorithm), to obtain candidate corresponding points. The SSDA method (successive similarity detection algorithm) is a method to determine the degree of similarity using a residual, by which the position where the residual of a part of a matrix is minimum is obtained as a candidate corresponding point. The SSDA template matching is relatively fast among other template matching schemes, and considered easily adaptable to hardware processing. Other schemes such as a normalized correlation method may be employed. In the template matching, it is important to select optimum template size and search range. An optimum search range can be set based on the frame rate of the video camera, the traveling speed, etc.

[Passing/Failing Judgment of Movement Vectors]

Candidate corresponding points for the respective feature points can be obtained through the template matching which, however, occasionally involve mismatching. In the case where a value from the SSDA template matching is too large (the accuracy is low), for example, such a point is judged to be mismatched. In the case where feature points fall on each other as a result of the template matching, their correlation values are compared so that priority will be given to the one with the better accuracy.

The movement vectors of the respective feature points can be obtained from the candidate corresponding points obtained through the template matching. Whether the obtained movement vectors are passing or failing, and the suitability of the candidate corresponding points, are judged to remove candidate corresponding points that were created as a result of mismatching (S14). First, the movement vectors of the respective feature points are compared with the screen relative movement amount between frames, to delete candidate corresponding points that exhibit an abnormal value and hence can be considered as showing erroneous correspondence. In this case, a threshold may be determined for use in the deletion. The screen relative movement amount is the amount of relative movement on the screen between the photographing device and the object to be photographed (which includes feature points). Even for an identical object to be photographed, the screen relative movement amount changes depending on the distance and direction with respect to the photographing device. Thus, the comparison may be made with the amounts of movement of the majority of feature points around that particular feature point (which move generally in the same way).

In this embodiment, the projective transformation is utilized to remove candidate corresponding points. On the assumption that the overall movement between frames is significantly short in terms of time and hence can be generally approximated through the projective transformation, the screen relative movement amount is estimated through the projective transformation (S15). That is, a projective transformation is performed to estimate the movement, the movement vectors of the respective feature points are compared with the screen relative movement amount, and candidate corresponding points exhibiting an abnormal value are rejected (S16).

As the moving body such as a car sways, the photographed images also sway. Thus, by correcting the rotation or the sway in the camera position using the projective transformation, the movement vectors and the screen relative movement amount with the rotation or the sway in the camera position removed can be obtained. This screen relative movement amount is estimated, and at the same time, candidate corresponding points that can be considered as showing erroneous correspondence are removed. Performing the projective transformation again after deleting the erroneous corresponding points improves the reliability of the candidate corresponding points. Using the candidate corresponding points with the rotation or the sway in the camera position corrected increases the accuracy of the template matching, and also the reliability of the movement vectors.

In the photographed screen, erroneous corresponding points can be created in the case where feature points are given to moving objects such as a car running, a bird flying or a leaf falling, or in the case where the camera sways significantly. The camera sway can be corrected through the projective transformation. On the other hand, objects that move differently from the object to be photographed can create erroneous corresponding points. Thus, removing erroneous corresponding points that were created by the movement of such objects can improve the reliability of the feature points (which include corresponding points and candidate corresponding points) and the accuracy in the judgment of mismatching, thereby coping with even significant sway of the video camera.

[Judgment of Arrangement of Corresponding Points]

Next, a judgment is made as to the arrangement of the corresponding points (S17). The arrangement of the candidate corresponding points after failing ones have been removed is checked. When judging the arrangement, establishment of new feature points may be commanded, or candidate corresponding points may be restored.

FIG. 5 schematically shows exemplary feature points and candidate corresponding points in corresponding point matching. The position of objects is slightly different between the left image and the right image. The left image has many feature points, while the right image has less candidate corresponding points corresponding thereto. This schematically shows that failing candidate corresponding points have been removed.

Figure 6A:
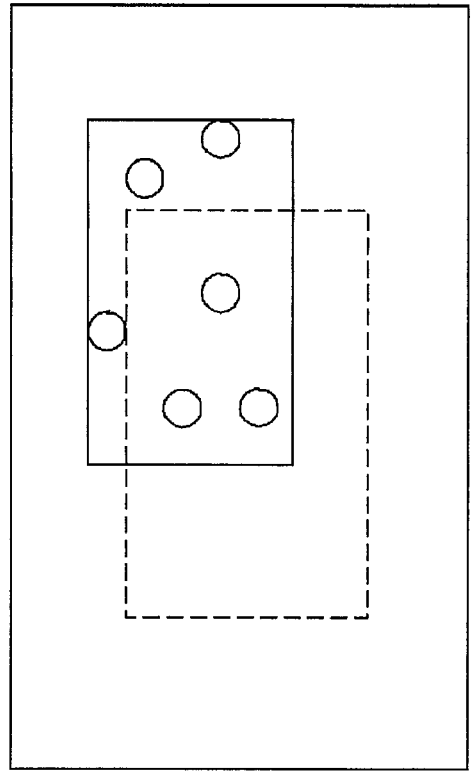
FIGS. 6A and 6B are a view of an example of establishing new feature points.
Figure 6B:
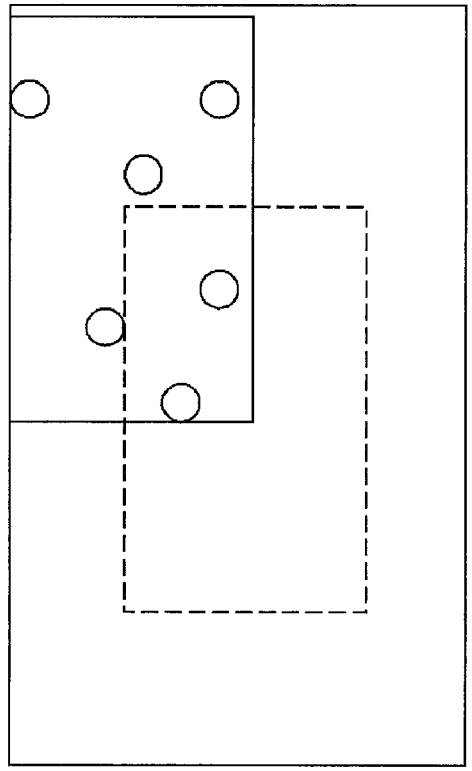

FIG. 6 shows exemplary establishment of new feature points. For example, in the case where the feature points on the screen are not arranged within a range of 50 percent of the width and height of the screen, or in the case where the center of the feature points is not in the vicinity of the center of the screen, the feature extraction section 3 is commanded to execute the process of establishing new feature points using a feature extraction operator. According to these criteria, in FIG. 6A, the feature points are deviated toward the upper right and the center of the feature points is out of the above range, so new feature points are established. In FIG. 6B, the center of the feature points is in the above range, so new feature points are not established. Also in the case where the number of feature points has fallen to a predetermined number or less, a command is given to establish new feature points for stable orientation analysis, etc.

It is checked whether or not the candidate corresponding points that once went out of the screen have appeared again within the screen. If there are any, such candidate corresponding points are restored. Specifically, an affine transformation is performed, using points remaining on the current frame, on the candidate corresponding points that went out of the screen and hence have been erased, to estimate their corresponding positions on the current frame. The template matching is performed again at the estimated positions to restore candidate corresponding points that have achieved good results.

In judging the arrangement, in the case where the candidate corresponding points are not failing and the arrangement thereof is in good accordance with the estimated value by the projective transformation, the process returns to the feature point extraction (S11) where, for such candidate corresponding points in a frame, a search is made for candidate corresponding points in a subsequent frame that correspond thereto. This process is repeated until the final frame of the photographed images such as moving images, to continue keeping track.

[Moving Image Processing]

Refer to FIG. 3 again. As for constitution, refer to FIG. 2. The positional relationship measurement section 9 measures the position and posture of photographing and supplies measured data to the moving image process section 5 (S90). The moving image process section 5, based on the measurement data and using the image-and-feature point selection section 6, selects images or feature points (S20); in other words, selects images to be processed (S20A) or feature point to be processed (S20B). Providing these measurement data and selecting the images to be processed and selecting the feature points to be processed are carried out in various stages; before, after, and in the middle of image acquisition (S10), feature point extraction (S11), and feature point tracking (S12). According to this embodiment, selecting the feature points and selecting images are carried out after tracking the feature points. Next, position measurement is made with the position measurement section 7 (S30). In other words, relative orientation is carried out (S32), and position coordinates, posture, and 3D coordinates of the camera are obtained (S34).

The comparing section 8 compares the information on the position and posture of photographing obtained with the positional relationship measurement section 9 with the information on the position and posture of photographing measured with the position measurement section 7 (S50). The display section 10, using characters, graphs, and images, displays the position information and posture information obtained in the image acquisition (S10), feature point extraction (S11), feature point tracking (S12), image-and-feature point selecting (S20), and position measurement (S30), and the position information and posture information obtained with the positional relationship measurement section 9 (S60).

Figure 7:
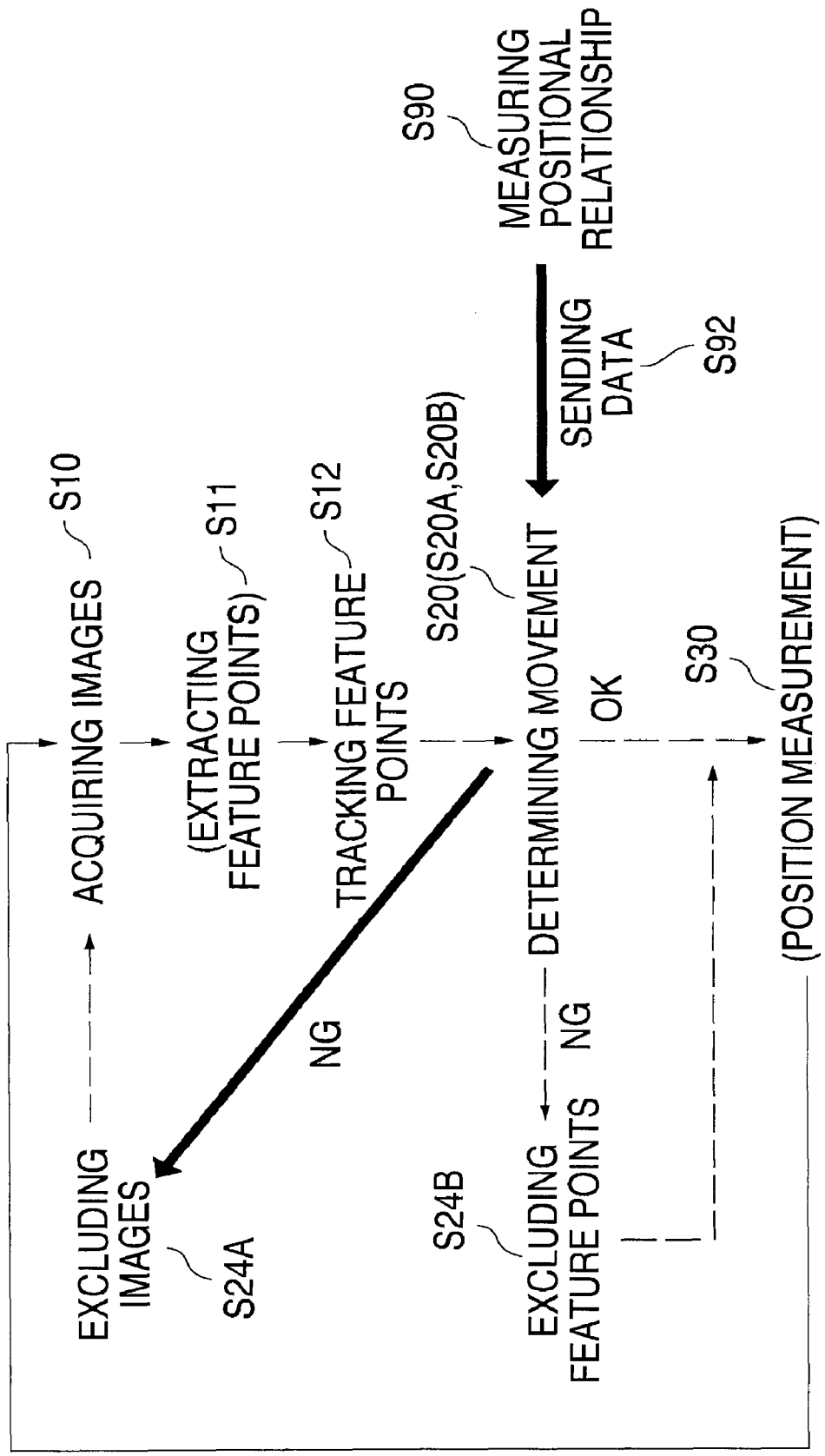
FIG. 7 shows an example process flow of selecting feature points and images after tracking feature points.

FIG. 7 shows an example process flow of selecting feature points and selecting images after tracking feature points. The flow is basically the same as that shown in FIG. 3, with the time points of selecting feature points and selecting images specified. Data on the direction, speed, and displacement amount are measured with the positional relationship measurement section 9 (S90) and transmitted (S92) to the image-and-feature point selection section 6 during or before feature point tracking (S12) and position measurement (S30). The image-and-feature point selection section 6 during feature point tracking (S12) and position measurement (S30) compares the data on the information on position and posture of images and feature points obtained in the process of image acquisition (S10), feature point extraction (S11), and feature point tracking (S12) with the data on the information on position and posture of the camera obtained by the positional relationship measurement (S90), and selects images to be processed and feature points to be processed. The image selection section 61 selects images to be processed from a series of photographed images (S20A). The feature point selection section 62 selects feature points to be processed from feature points extracted from photographed images (S20B). For example, as explained with FIG. 8, first, the feature point selection section 62 compares the displacement vectors of respective feature points with sense and magnitude of the gyroscope vectors. Feature points that do not fall within a specified range are deemed inappropriate and excluded. The image selection section 61 judges images having relatively great number of feature points to be processed as images to be processed. Images having relatively small number of feature points to be processed are excluded as inappropriate. Images and feature points not selected are excluded (S24A, S24B). In case an image is excluded, the step goes back to image acquisition (S10) to select another image. When an image to be processed and a feature point to be processed are selected, they are subjected to position measurement (S30). Incidentally, the image exclusion (S24A) is included in selecting images to be processed (S20A); and the feature point exclusion (S24B) is included in selecting feature points to be processed (S20B). Incidentally, the feature point extraction (S11) and the position measurement (S30) need not be made every time.

Figure 8:
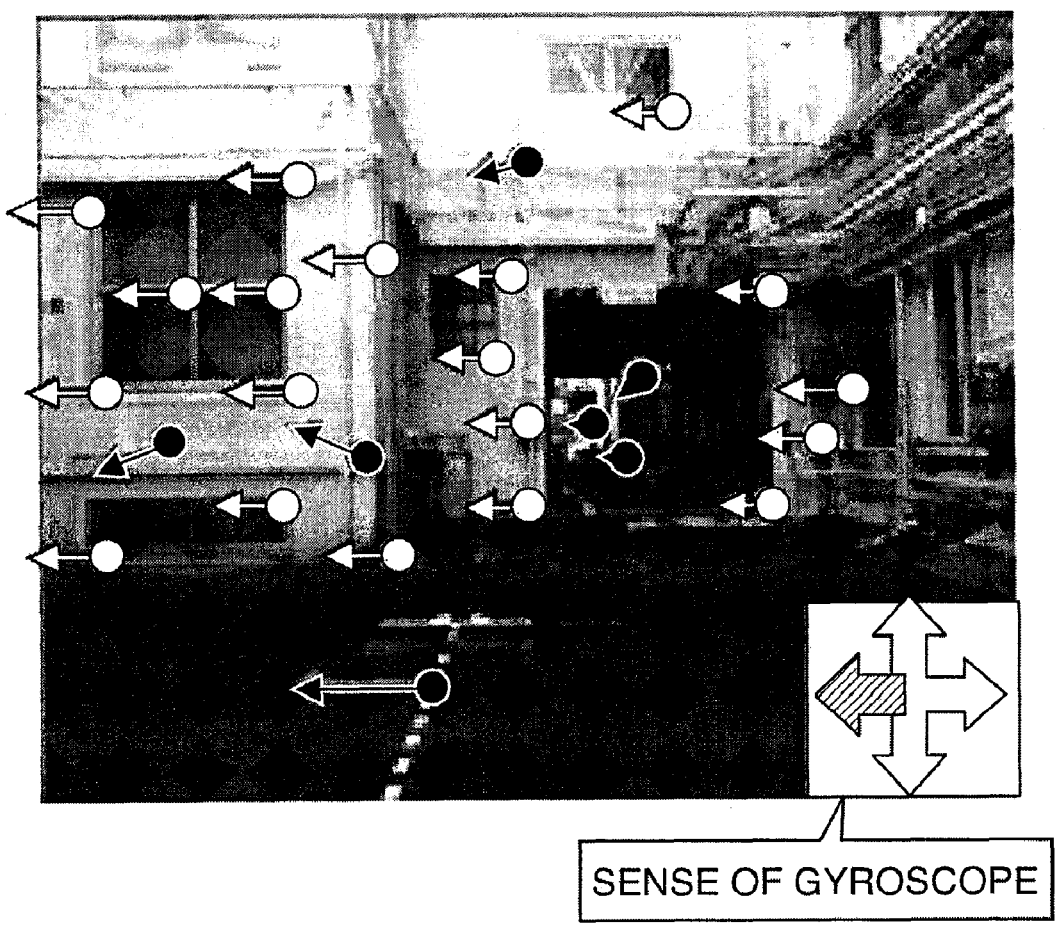
FIG. 8 shows an example display of a determination screen for selecting feature points.

FIG. 8 shows an example of display on the judgment screen for selecting images and selecting feature points. The display section 10 displays. The circle (○) in the screen indicates a feature point, and the arrow (→) indicates the displacement vector. They indicate direction and amount of displacement of the feature point. In specific terms, the displacement amount represents the difference from a frame earlier by a specified time period or by a specified number of frames. It is preferable that the change from one image to another is small and the difference in the displacement amount is of an extent that is visually discernible. In the right lower corner is indicated the sense of the gyroscope mounted for example on the vehicle together with the camera. Here, the sense of the gyroscope is the direction of vehicle travel (opposite direction) measured with the inertia sensor 91 of the positional relationship measurement section 9. The display in the opposite direction here is the reflection of the fact that the Coriolis force acting on the gyroscope works in the direction of maintaining inertia; however, the display may be made to indicate the sense of displacement. Moreover, displacement amount, speed, acceleration, and posture may be displayed together. These items may be displayed with a graph with numerals and graphs arranged in time series.

Because a case is conceivable in which the gyroscope in the comparing section 8 is not stabilized, the sense of the gyroscope is compared with the displacement vector on the screen. In case the direction of the gyroscope is in agreement with the sense of most of the displacement vectors, the gyroscope may be deemed stabilized, and its direction is compared with the displacement vector of individual feature points. Here, the feature point selection section 62 determines to leave feature points with their displacement vector sense being approximately the same as that of the gyroscope direction, or with their sense within a specified range, and to exclude the other feature points. The section 62 also determines to leave feature points with their displacement amount being almost in agreement with most of the displacement vector, or with their displacement amount being within a specified range, and to exclude the other feature points. For example, feature points with small displacement amount are deemed to have no movement and determined to be excluded. The section 62 also deems that distant points and extremely close points are inappropriate for orientation and 3D measurement and to be excluded. The specified range is meant to be a range capable of realizing sufficient positional accuracy typically by stereo method. For example, the range may be chosen as ±10% and ±10 degrees. At this time, the display section 10 displays for example feature points which the feature point selection section 62 has determined to exclude because they are inappropriate in red and those determined to be appropriate in green. In FIG. 8, red is indicated with ●, and green with ○. When the operator confirms and clicks the confirmation button, the feature point selection section 62 excludes the feature points displayed in red. The display section 10 eliminates feature points displayed in red and their displacement vectors from the screen, and leaves feature points displayed in green and their displacement vectors. Alternatively, the above steps may be automated. In this case, the operator has an advantage of being able to visually confirm if the measurements on the current scene are appropriate and if reliability is high, even by only confirming retroactively the feature points and displacement vectors displayed in green or red.

Figure 9:
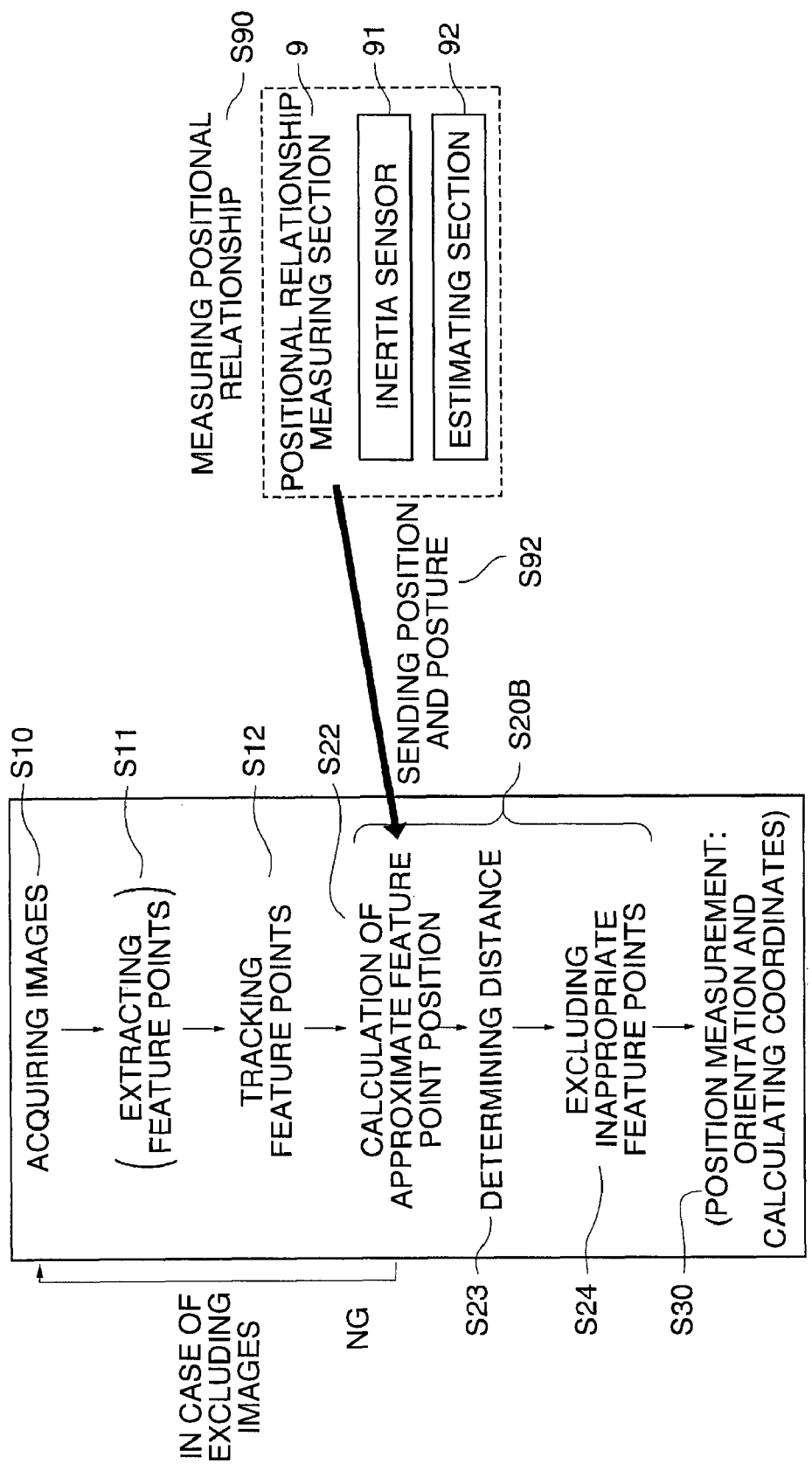
FIG. 9 shows an example process flow of selecting feature points and images after tracking feature points.

FIG. 9 shows an example of process flow when selecting feature points and selecting images after tracking feature points. The flow is basically the same as in FIG. 3, with the feature point selecting time specified. While the flow of FIG. 7 and the flow of FIG. 9 may be implemented independently, explanation here is made collectively in a single embodiment, because combining both flows improves accuracy. The positional relationship measurement section 9 measures data on position and posture (S90) and transmits these data (S92) to the image selection section during or before feature point tracking (S12) and position measurement (S30). The feature point selection section 62, using data on the travel distance, position, and tilt of the camera detected with the inertia sensor 91 during feature point tracking (S12) and position measurement (S30), calculates by the intersection method approximate distance to the photographed object (S22), calculates approximate distance between each feature point and the camera, determines feature points located approximately within a specified range to be the feature points to be processed (S23), and excludes feature points outside the range as inappropriate (S24). The image selection section determines images with relatively many feature points to be processed to be images to be processed, and excludes images with relatively few feature points as inappropriate. The specified range is meant to be a range capable of realizing sufficient positional accuracy typically by stereo method. For example, the range may be chosen as ±10%. When the determination results are reflected on FIG. 8 by displaying feature points with their approximate distance outside the specified range in red, inappropriate feature points according to the flow of FIG. 9 as well as FIG. 7 may be eliminated and accuracy of position measurement may be improved. Incidentally, the steps from the calculation of approximate feature point position (S22) to the exclusion of inappropriate feature points (S24) are included in the selection of processing object feature points (S20B). The steps of determining processing object images and excluding inappropriate images are included in the selection of processing object images (S20A). Incidentally, when the flow of FIG. 7 is combined with the flow of FIG. 9, the flow from S20 to S24 is run individually and then united; the other flows are in common. From S20 to S24, either flow may be run first, or in parallel. After that, a stereo pair is selected from the images to be processed, and the process goes on to position measurement. Here, to calculate the approximate distance, the position data and posture data coming sent from the positional relationship measurement section 9 are used as model coordinates. Three-dimensional coordinates of the feature point are obtained by putting the data into the equations (3) and (4) explained in the next paragraph under the title of "Orientation process and 3D measurement." Further, 3D coordinates of the feature point are put into the equation (5) to obtain model coordinates and approximate distance.

[Orientation Process/3D Measurement]

Next, the position measurement section 7 performs relative orientation and 3D measurement. For respective images selected as a stereo pair, an orientation process is performed using the coordinates of the feature points and the corresponding points. The position and tilt of the camera that photographed the images, and the 3D positions of the corresponding points, can be obtained through the orientation process. In the orientation process, the relative orientation is performed to correlate the photographed images selected for a stereo pair, while bundle adjustment is used to determine the orientation between a plurality or all of the images. In order to select such a stereo pair, the position measurement section can select a pair of images estimated to have suitable baseline lengths, from the plurality of images acquired with the image acquisition section, thereby enabling suitable orientation process and 3D measurement.

[Relative Orientation Process]

Figure 10:
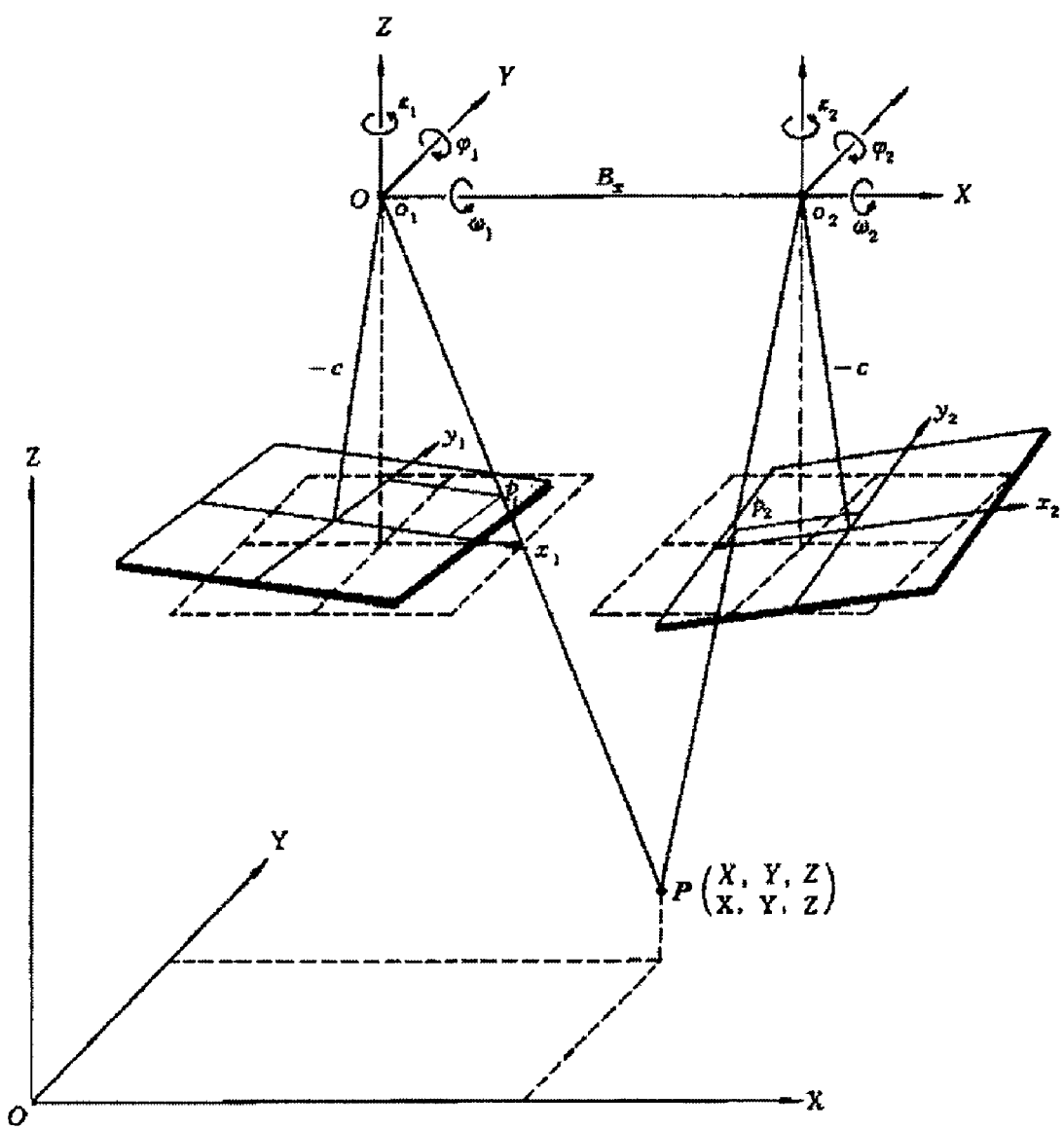
FIG. 10 is an explanatory diagram of orientation determination.

FIG. 10 is an explanatory diagram of the orientation determination. This drawing illustrates the relationship between a model image coordinate system XYZ and camera coordinate systems $x_1 y_1 z_1$ and $x_2 y_2 z_2$ in a stereo image. The origin of the model image coordinate system is defined as the left projection center, and the line connecting it and the right projection center is defined as the X-axis. The baseline length Bx (distance between the origins of the camera coordinate systems) is defined as the unit length of the reduction scale. The parameters to be obtained here are six rotational angles, namely Z-axis rotational angle $\kappa 1$, Y-axis rotational angle $\phi 1$ and X-axis rotational angle $\omega 1$ of the left camera, and Z-axis rotational angle $\kappa 2$, Y-axis rotational angle $\phi 2$ and X-axis rotational angle $\omega 2$ of the right camera. These rotational angles are obtained through the orientation calculation process, and used to calculate the precise 3D coordinates and posture of the camera, and the 3D coordinates of the object. The orientation determination and the 3D measurement can be automated (see Patent Document 1).

First of all, the parameters required to decide the positions of the left and right cameras are obtained from the coplanarity condition equation (1) below: The screen distance C is equivalent to the focal length f.

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = C \quad (1)$$

$X_{01}, Y_{01}, Z_{01}$: projection center coordinates of left image $X_{02}, Y_{02}, Z_{02}$: projection center coordinates of right image $X_1, Y_1, Z_1$: image coordinates of left image $X_2, Y_2, Z_2$: image coordinates of right image Under the above conditions, the coplanarity condition equation (1) can be transformed into the equation (2), and the respective parameters can be obtained by solving the equation (2):

$$f(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_1 = 0 \quad (2)$$

Here, such coordinate transformation relations (3) and (4) as given below hold between the model coordinate system XYZ and the camera coordinate system xyz:

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} \quad (3)$$

$$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \quad (4)$$

$$\begin{pmatrix} \cos\phi_2 & 0 & \sin\phi_2 \\ 0 & 1 & 0 \\ -\sin\phi_2 & 0 & \cos\phi_2 \end{pmatrix} \begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix}$$

Coordinates of a point in the model coordinate system are assumed to be:

$X=(X_1+X_2)/2, Y=(Y_1+Y_2)/2$

The distance is obtained from the above values and the position $(X_0, Y_0, Z_0)$ of the photographing device obtained with the positional relationship measurement section 9.

Distance $= ((X-X_0)^2 + (Y-Y_0)^2)^{1/2}$ (5)

Using these equations, unknown parameters are calculated by the following procedures:

(i) Initial approximate values of the parameters ($\kappa_1, \phi_1, \kappa_2, \phi_2, \omega_2$) are normally 0.

(ii) A derivative coefficient obtained when the coplanarity condition equation (2) is linearized, or Taylor-expanded, around the approximation is obtained from the equations (3) and (4), to formulate an observation equation.

(iii) A least squares method is applied to calculate correction amounts for the approximate values.

(iv) The approximate values are corrected.

(v) Using the corrected approximate values, the operations (ii) to (v) are repeated until a convergence is achieved.

If a convergence is achieved, a connection orientation is performed in addition. This process standardizes the tilts and reduction scales between respective models to be represented in an identical coordinate system.

To perform this process, connection differentials represented by the following equations are calculated:

$\Delta X_j = (X_{jr} - X_{j1})/(Z_0 - Z_{j1})$ $\Delta Y_j = (Y_{jr} - Y_{j1})/(Z_0 - Z_{j1})$ $\Delta Z_j = (Z_{jr} - Z_{j1})/(Z_0 - Z_{j1})$ $\Delta D_j = (\Delta X_j^2 + \Delta Y_j^2)^{1/2}$ ($\Delta X_{j1} \Delta Y_{j1} \Delta Z_{j1}$): j-th left model in standardized coordinate system ($\Delta X_{jr}, \Delta Y_{jr}, \Delta Z_{jr}$): j-th right model in standardized coordinate system If $\Delta Z_j$ and $\Delta D_j$ are 0.0005 (1/2000) or less, the connection orientation is considered to have been properly performed. If it was not properly performed, orientation results with an error indication are output to show which part of the image is not suitable. In this case, the other orientation points on the image, if any, are selected to repeat the above calculations (ii) to (v). If it does not work, the arrangement of the orientation points is changed.

The above values may be calculated from the feature point tracking data or by adopting the various data of the positional relationship measurement section 9 as initial values.

[Rectification Process]

In the rectification process, the images are rectified such that the epipolar lines of the left and right images will be coincided with each other on a horizontal line, so as to be transformed into images to which a stereo method can be applied. Also, a 3D measurement is performed using image data obtained in the orientation process and the rectification process.

Figure 11:
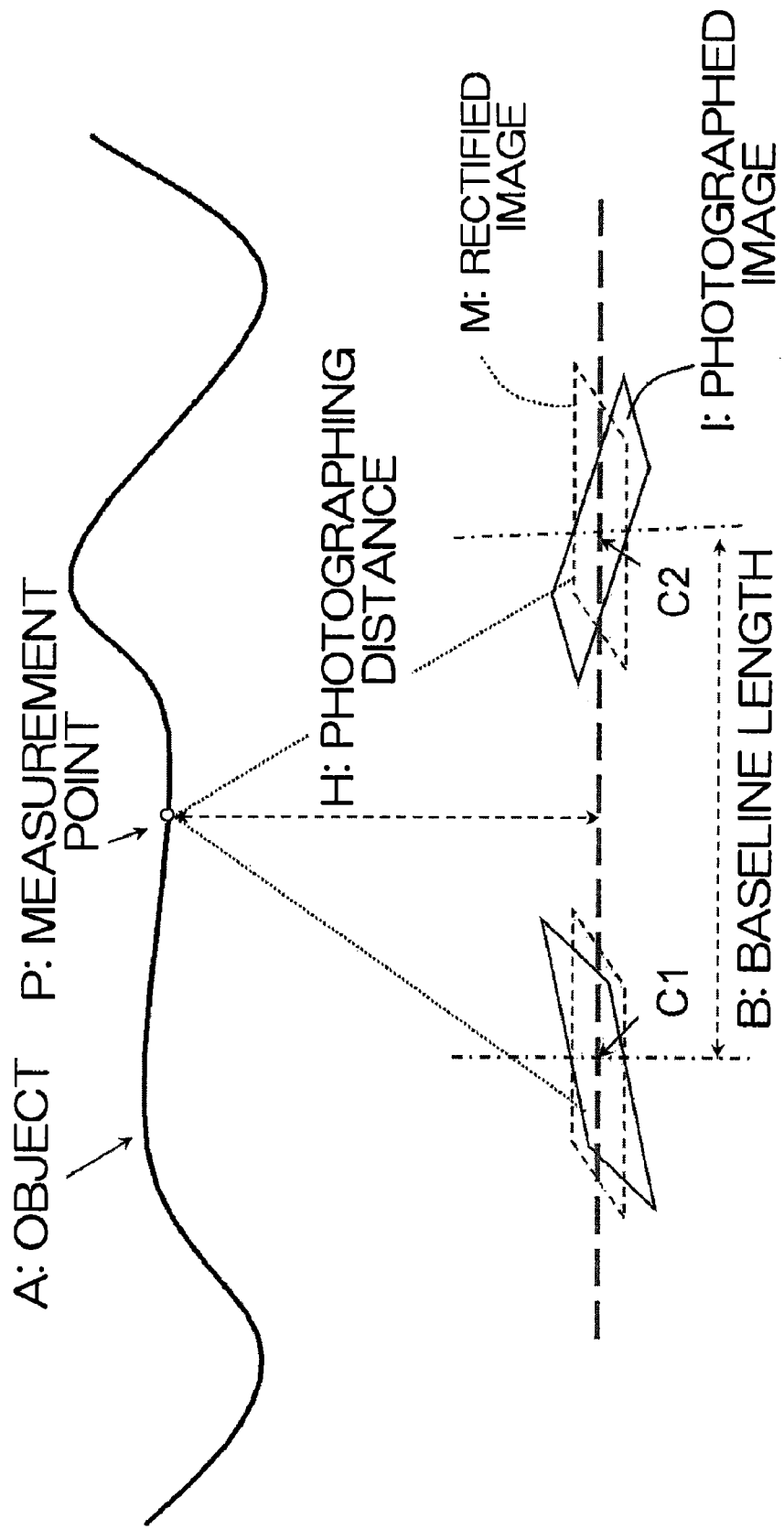
FIG. 11 shows relationship between 3D coordinate position of the feature point and the camera position.

FIG. 11 shows the relationship between the 3D coordinate position of a corresponding feature point and the position of a camera. Stereo cameras C1 and C2 photographs a measurement point P on an object A to be photographed in stereo (the camera positions are indicated by C1 and C2 in FIG. 11). Photographed images (original image) I are acquired with the tilt and sway in position of the camera reflected. However, rectified images M have aligned epipolar lines with the tilt and sway in position of the camera rectified, and thus are suitable for distance measurement. The baseline length B of the cameras can be easily obtained by calculation using two photographing positions obtained in the relative orientation process. The photographing distance H can be obtained based on the camera positions and the 3D coordinate positions of the feature points calculated in the 3D measurement.

[Stereo Method]

Now, the 3D coordinates of each feature point (candidate corresponding point) are calculated. The 3D coordinates are calculated by a stereo method, for example.

Figure 12:
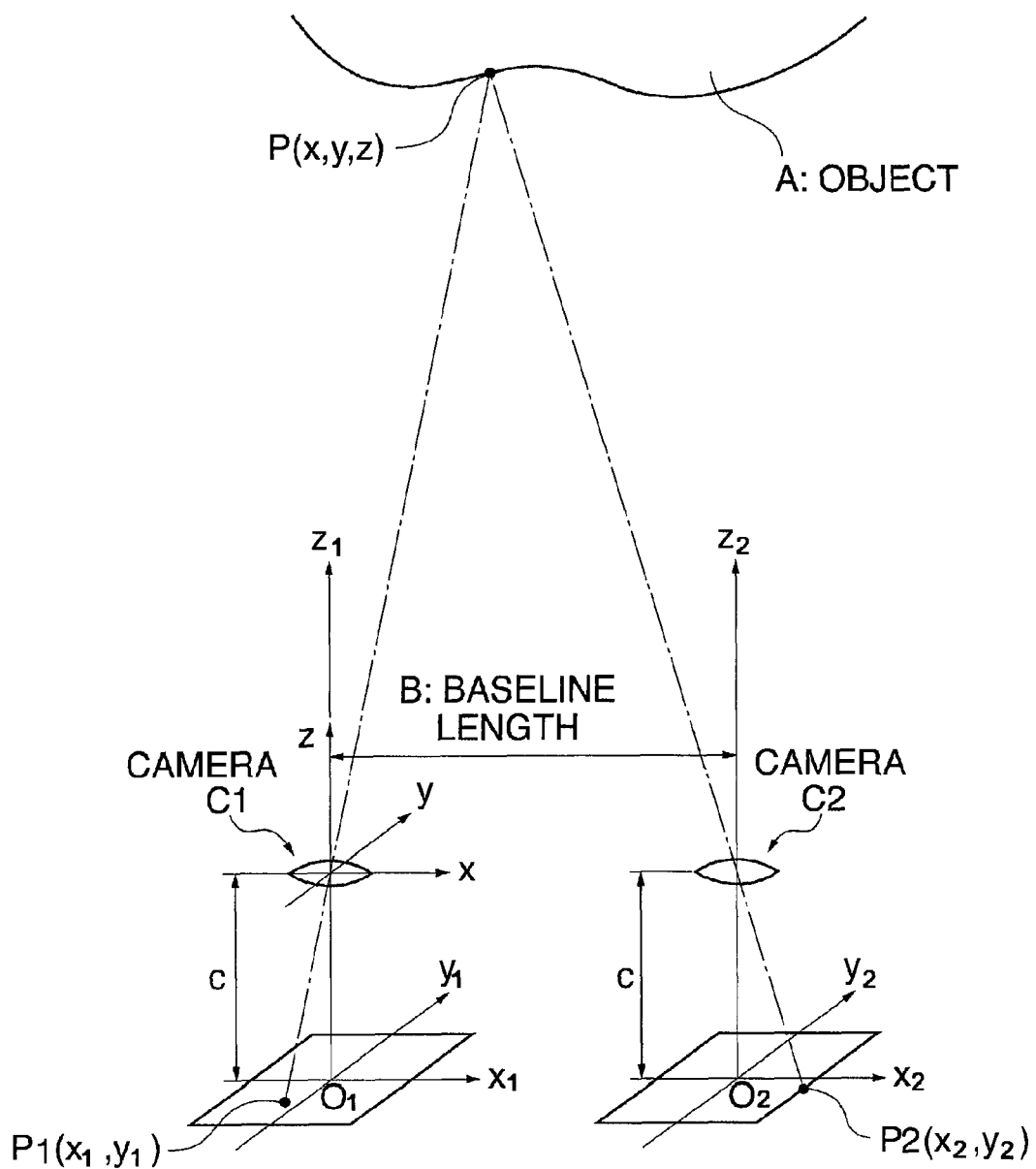
FIG. 12 is a drawing for explaining a stereo method.

FIG. 12 is a diagram for explaining a stereo method. For simplicity, it is assumed that two cameras C1 and C2 of the same specifications are used. The optical axes of the cameras C1 and C2 are parallel to each other, the distances "c" from the principal point of the camera lens to the CCD surface are the same, and the CCDs are disposed perpendicular to the optical axes. The distance between the optical axes of the two cameras C1 and C2 (baseline length) is represented as "B".

The coordinates of a point P1 ($x_1, y_1$) and a point P2 ($x_2, y_2$) on the CCD surface formed from a point P (x, y, z) on an object have the following relationship.

$$X_1 = cx/z \quad (6)$$

$$y_1 = y_2 = cy/z \quad (7)$$

$$x_2 - x_1 = cB/z \quad (8)$$

Note that the origin of the entire coordinate system (x, y, z) is located at the principal point of the lens of the camera C1.

"z" can be obtained from the equation (8), and "x" and "y" can then be obtained using the "z" from the equations (6) and (7).

As can be understood from the explanation of the stereo method, if the photographing distances (magnifications), directions and baseline length B of the cameras C1 and C2 change, this principle becomes less likely to hold and as a result it becomes more difficult to obtain solutions with stable precision. It is also possible not to carry out the rectification process, search for a point corresponding to the feature point on the epipolar line, and find out 3D coordinates by the stereo method.

It is also possible to further improve accuracy of 3D measurements by comparing, in the comparing section 8, the information on the photographing position and posture obtained with the positional relationship measurement section 9 with the information on the photographing position and posture measured with the position measurement section 7, and correcting the 3D coordinate values.

According to the first embodiment described above, a technique is provided that makes it possible to accurately measure the coordinates of photographing position and posture of the photographing device from moving images or photographed images that change little by little in succession. The processes of moving images can be implemented on a computer and it is possible to automate all the processes of the image processing method, including those already automated such as orientation determination and 3D measurement. The first embodiment also allows stably obtaining the 3D coordinates of the photographing device with high precision.

Second Embodiment

While the first embodiment is described as an example of selecting the feature points and selecting images after extracting feature points, this embodiment is described as an example of selecting images after acquiring images.

Figure 13:
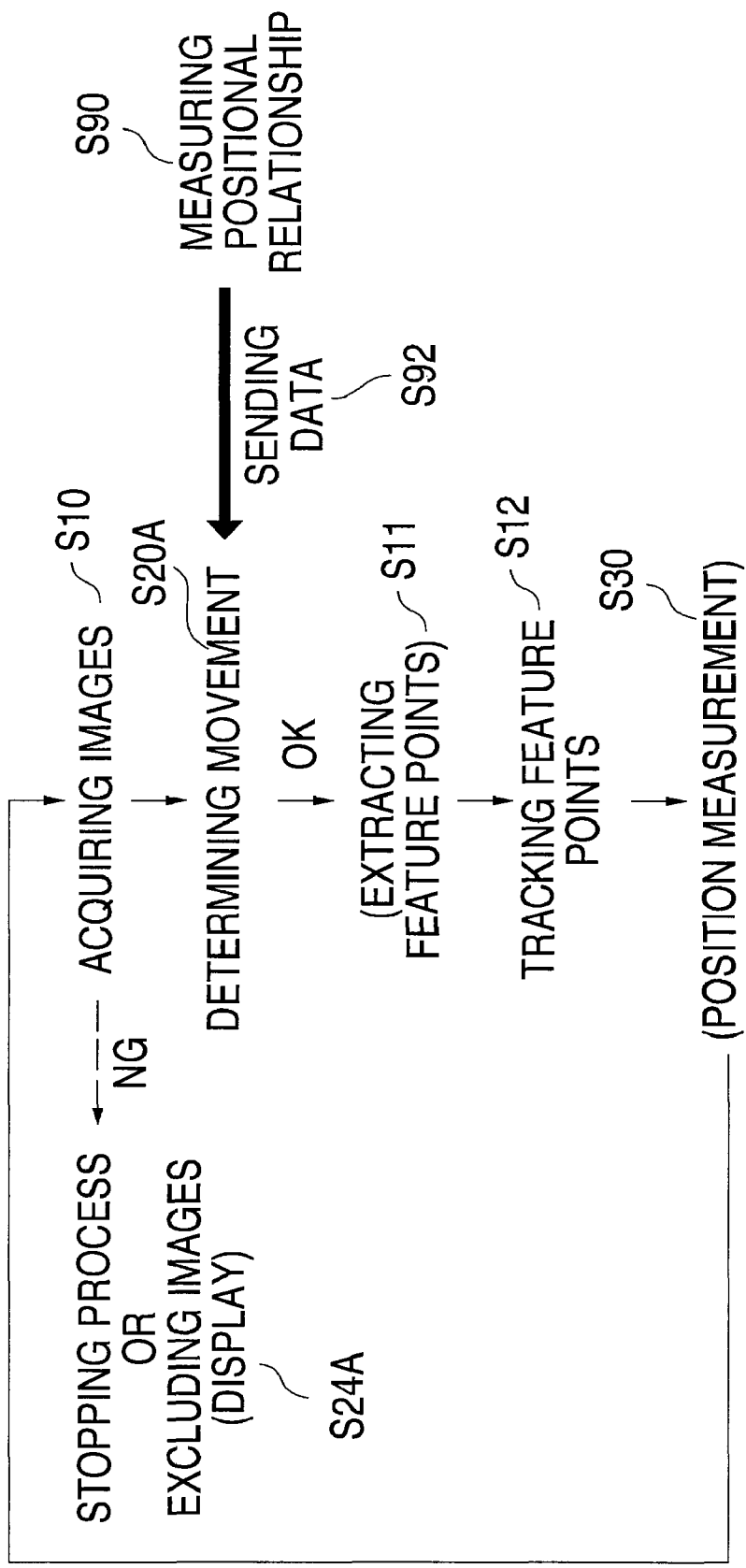
FIG. 13 shows an example process flow of selecting images after acquiring images.

FIG. 13 shows a flow of process of selecting images after acquiring the images. The flow is basically the same as that shown in FIG. 3, with the image selecting time specified. Sensor output data (such as sense, angular velocity, and acceleration of gyroscope) are obtained with the positional relationship measurement section 9, and provided to the image selection section 61 (S92) during or before the image acquisition (S10) and feature point extraction (S11). The image selection section 61, when sensor output is not detected or nearly nil, assumes that the camera is motionless, takes no step, determines such an image to be inappropriate (S20A), and discarded (S24A). In case the sensor output exceeds a specified threshold due to vibration or motion of a magnitude exceeding the moving image processing speed, for example when blur or streak is detected on a photographed image, the image is determined to be inappropriate for processing (S20A) and discarded (S24A). Incidentally, the elimination of the inappropriate image (S24A) is included in the selection of images to be processed (S20A). After that, the process goes on to feature point extraction, feature point tracking, and position measurement. Incidentally, feature point extraction and position measurement need not be made every time.

Figure 14:
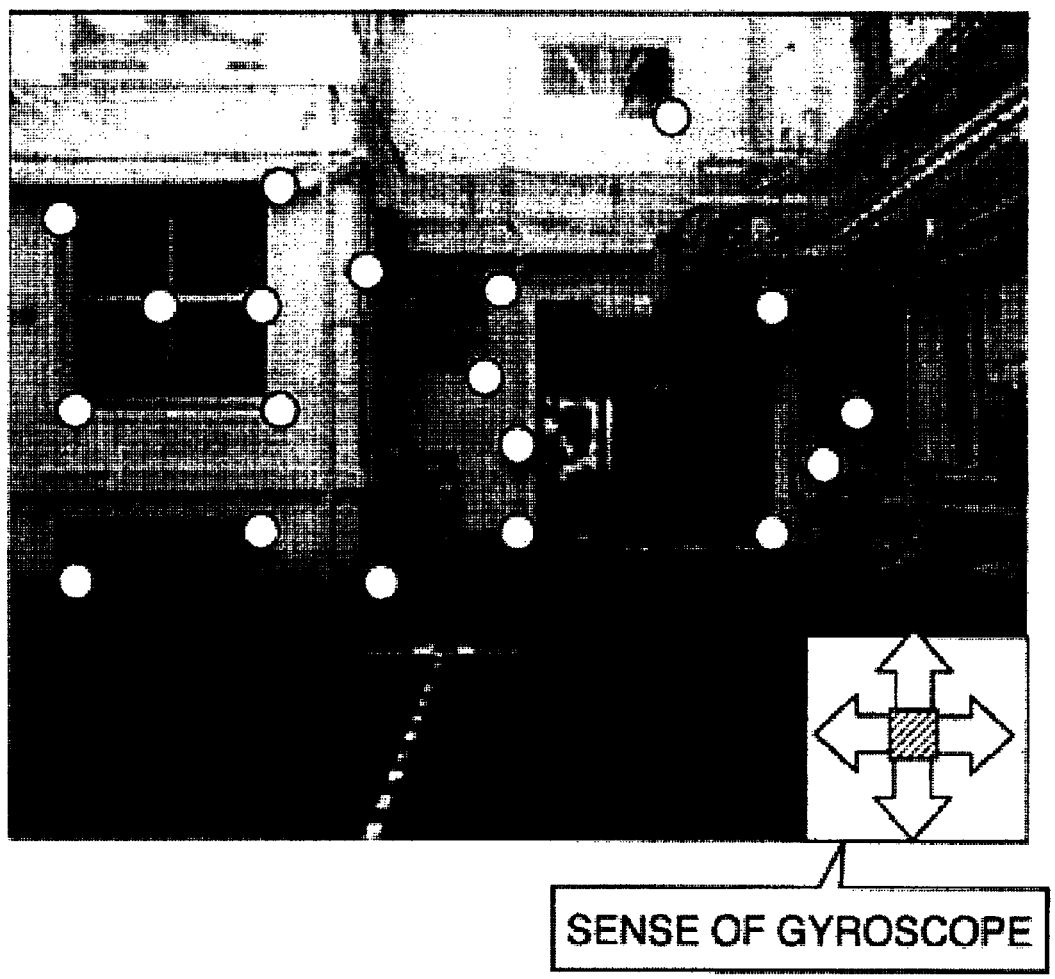
FIG. 14 shows an example of standing image.

FIG. 14 shows an example of standing image. The gyroscope sense is zero and no displacement is present. In case that feature point extraction and feature point tracking have been made, magnitude of displacement vector is zero. Such an image is deemed inappropriate and discarded.

Third Embodiment

While the first embodiment is described as an example of selecting the feature points and selecting images before or after extracting feature points, this embodiment is described as an example of selecting feature points and selecting images after extracting feature points.

Figure 15:
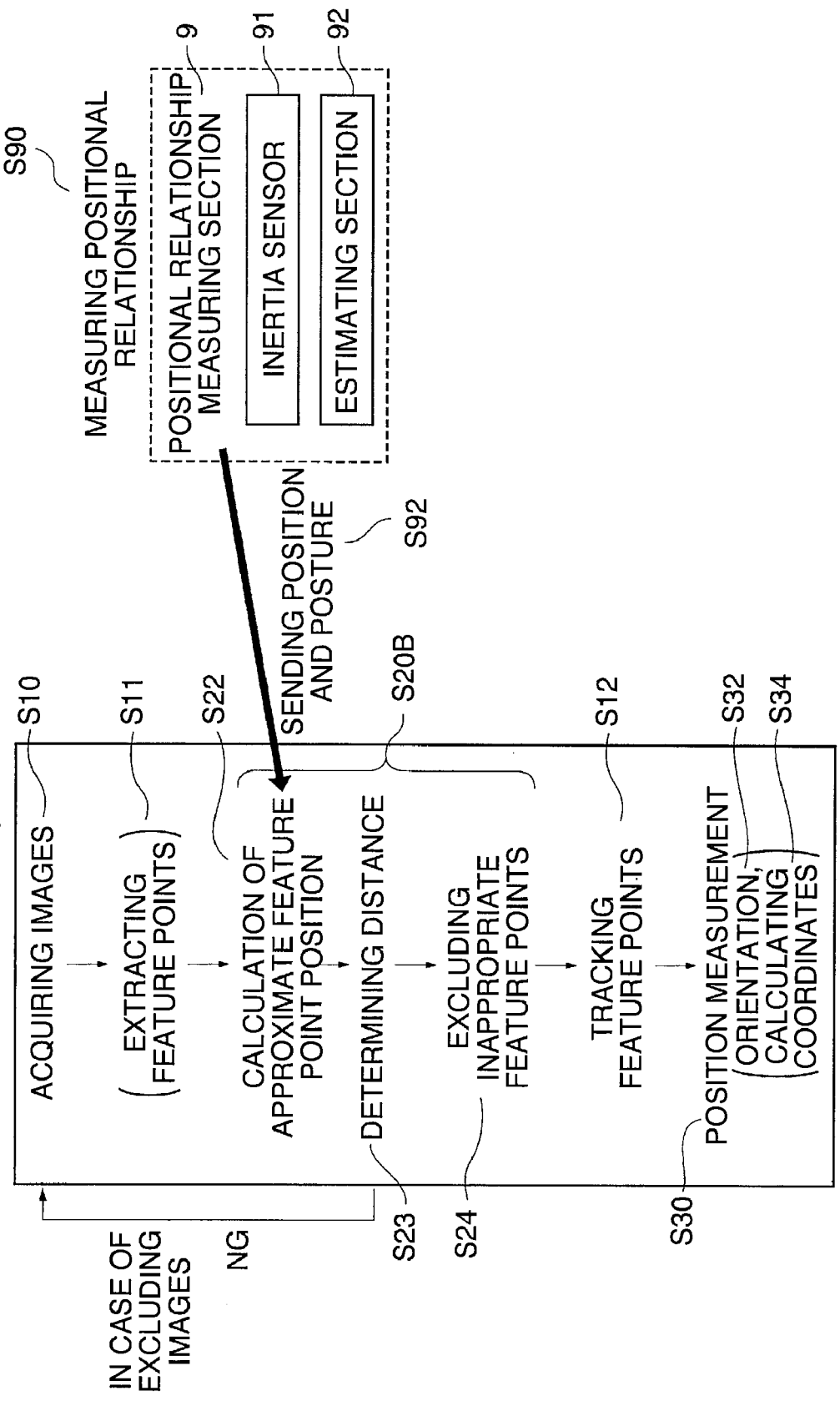
FIG. 15 shows an example process flow of selecting feature points and images after extracting feature points.

FIG. 15 shows an example process flow of selecting feature points and images after extracting feature points. The flow is basically the same as that shown in FIG. 3, with the image selecting time specified. Data on the direction, speed, and displacement amount are measured with the positional relationship measurement section 9 (S90) and transmitted (S92) to the image-and-feature point selection section 6 during or before the feature point extraction (S11) and feature point tracking. The image-and-feature point selection section 6, during the feature point extraction (S11) and feature point tracking, calculates the 3D coordinates (approximate position) of the feature point (S22) and approximate distance between each feature point and the camera by the intersection method using image coordinates of the feature point, and data on the posture (directions of three axes) and photographing position (3D position), determines feature points within a specified range of distance to be feature points to be processed (S23), and excludes feature points outside the range as inappropriate (S24). The image selection section 61 selects images having relatively many processing object feature points as the object images to be processed, and determines images having relatively few processing object feature points to be inappropriate and excludes them. Here, the steps from calculating approximate feature point position (S22) to excluding inappropriate feature points (S24) are included in selecting object feature points to be processed (S20B). Determining the object images to be processed and excluding inappropriate images are included in selecting the object images to be processed (S20A). After that, a stereo pair is selected from the object images to be processed, and the process goes on to position measurement.

Figure 16:
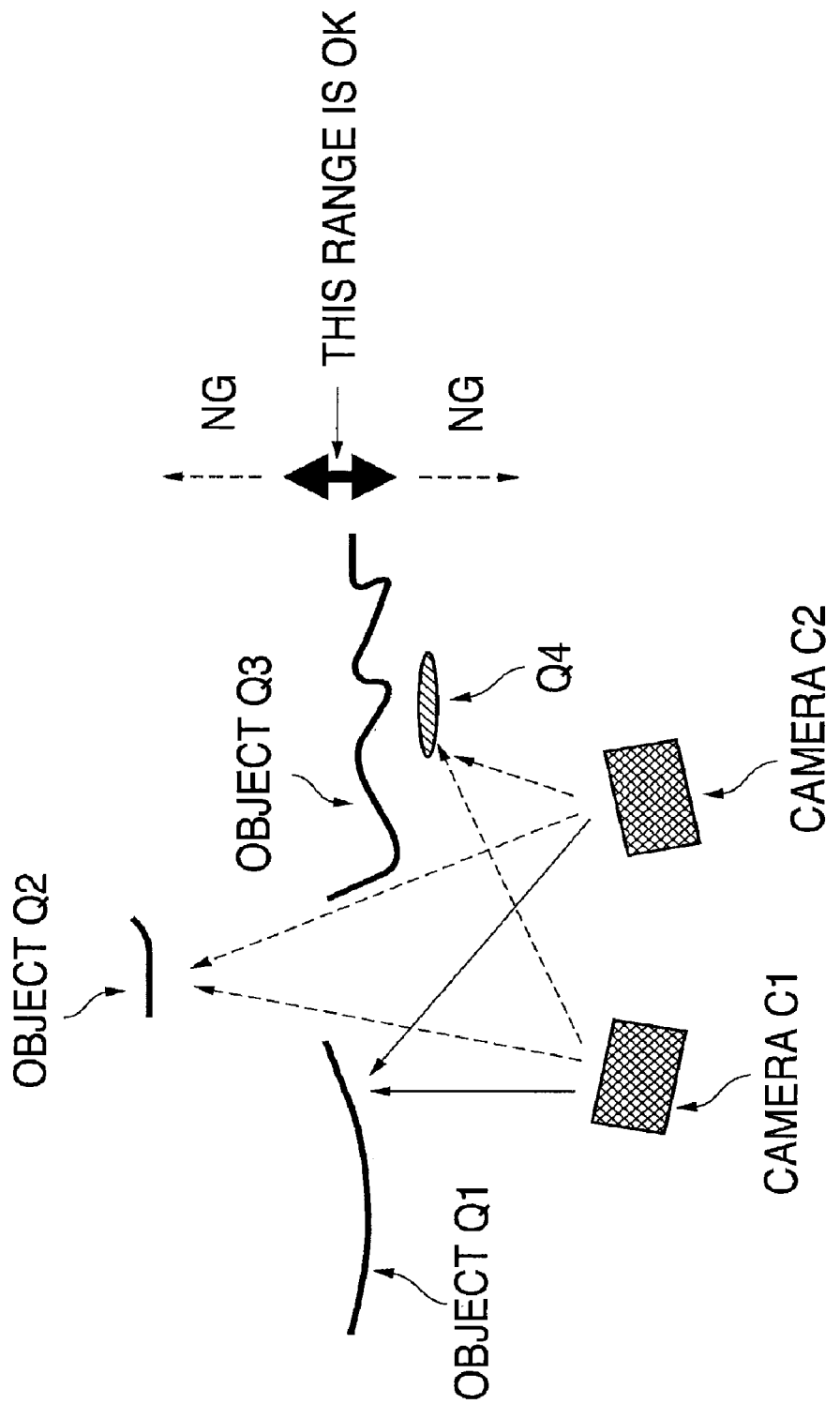
FIG. 16 is a drawing for explaining selecting feature points using approximated distance.

FIG. 16 is to explain selecting feature points using roughly calculated distances. For the process, refer to FIG. 15. Symbols Q1 to Q4 are objects to be photographed. Symbols C1 and C2 indicate camera positions. The feature point selection section 62 determines approximate position of feature point of the object to be photographed based on the camera positions C1, C2 (S22), determines (S23) feature points located within a specified range of distance from the camera as feature points to be processed. Those outside the range are deemed inappropriate and excluded (S24). In the figure, the feature points on the photographed objects Q1 and Q3 are selected; however, the feature points on the photographed objects Q2 and Q4 are deemed inappropriate and excluded.

Figure 17:
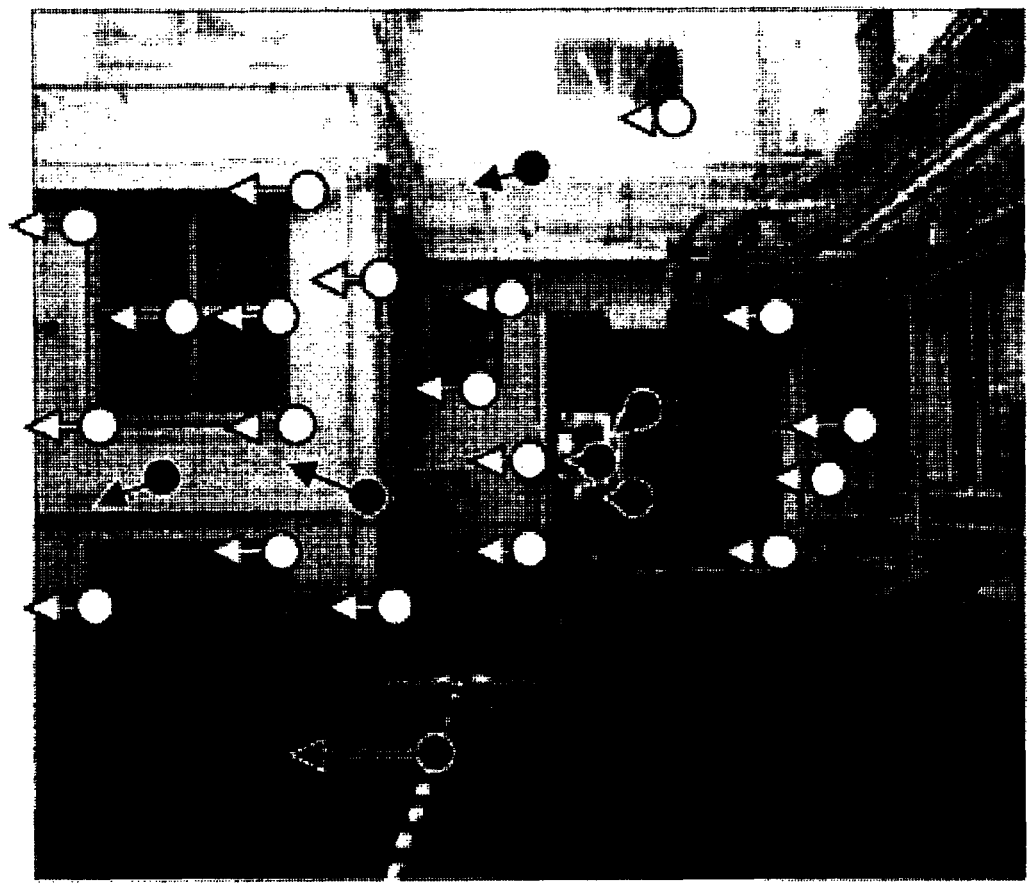
FIG. 17 is an example screen for explaining selecting feature points using approximated distance.

FIG. 17 shows an example screen for selecting feature points by approximated distances. For example, feature points within a specified range of distance are displayed in green, and feature points outside the range (far points and near points) are displayed in red. Feature points in green are adopted and those in red are excluded. In FIG. 17, red is indicated with ●, and green is indicated with ○. Incidentally, the determination by approximated distances may be combined with the determination explained with FIG. 8 in which displacement vector of each feature point is compared with the sense and magnitude of the gyroscope, and feature points not falling within a specified range are deemed inappropriate and excluded. In that case, position accuracy is improved.

Figure 18:
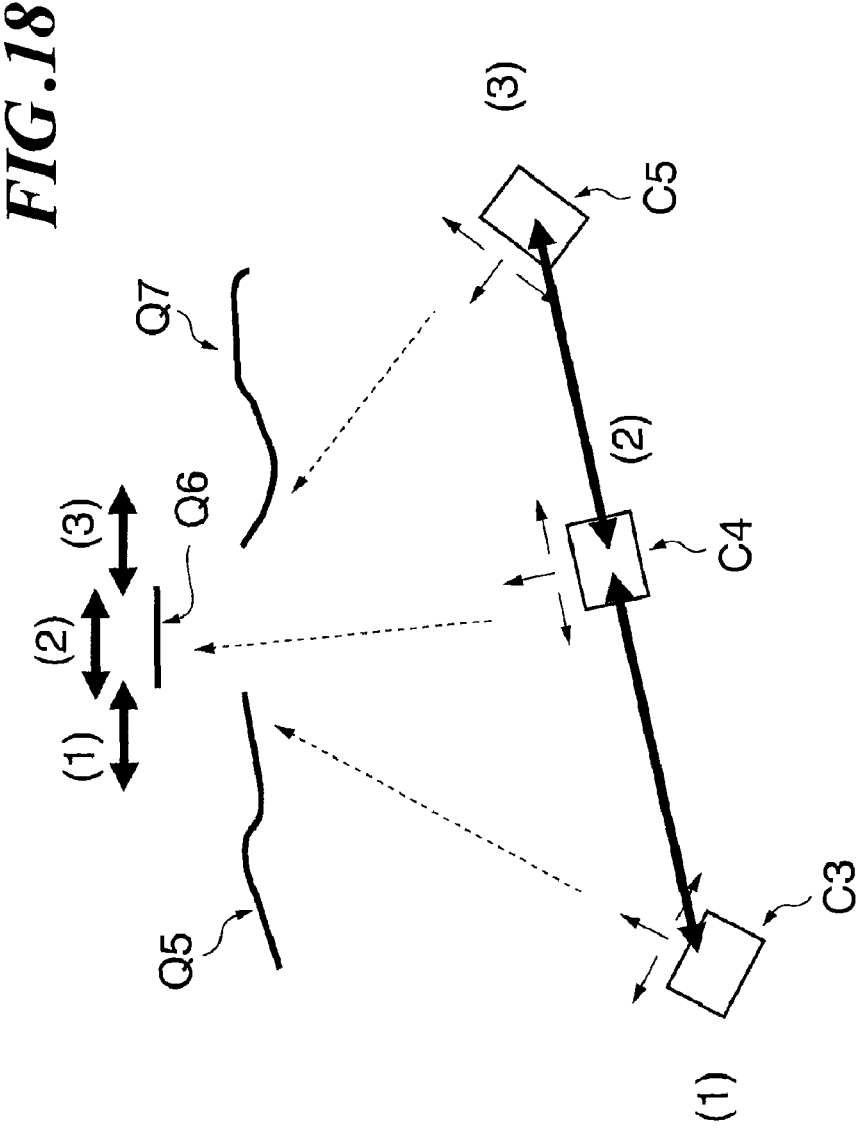
FIG. 18 is a drawing for explaining selecting images using approximated distance.

FIG. 18 is to explain the selection of images by the approximated distances. Symbols Q5 to Q7 represent objects to be photographed; and C3 to C5, camera positions. The inertia sensor 91 detects the travel distance of the camera. The image selection section 61 calculates approximate position to the photographed object by intersection method using data on the position and tilt of the camera. The distance from each of the camera positions C3, C4, and C5 to the photographed object is obtained. Images within a specified range of distance are determined to be images to be processed; and those outside the range, deemed inappropriate and excluded. In the drawing, the images of the objects Q5 and Q7 are selected but the image of the object Q6 is excluded as inappropriate. After that, a stereo pair is selected from the object images to be processed, and the process goes on to position measurement.

Fourth Embodiment

While the first embodiment is described as an example of selecting feature points and selecting images after extracting feature points, this embodiment is described as an example of selecting feature points and selecting images while tracking feature points.

Figure 19:
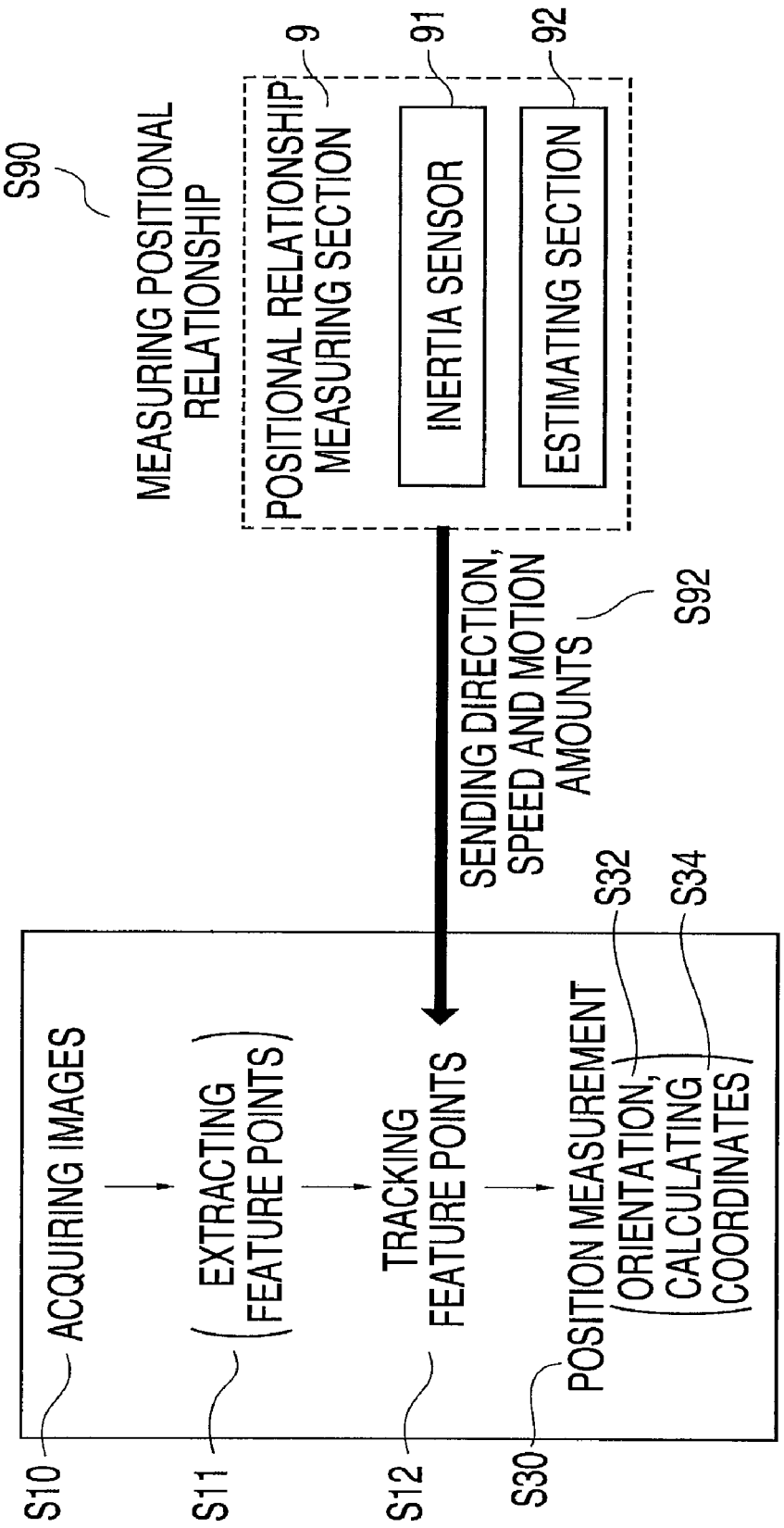
FIG. 19 shows an example process flow of selecting feature points while tracking feature points.

FIG. 19 shows an example flow of selecting feature points while tracking feature points. The flow is basically the same as that shown in FIG. 3, with the feature point selecting time specified. The positional relationship measurement section 9 measures data on such items as direction, speed, and displacement amount (S90). While feature points are being tracked (S12), the data on the direction, speed, and displacement amount etc. are transmitted (S92) to the image-and-feature point selection section 6. While feature points are being tracked, the image-and-feature point selection section 6 calculates 3D coordinates (approximate position) of the feature point by intersection method using data on the posture (directions of three axes) and photographing position (3D position), and image coordinates of the feature point, calculates approximate distance from each feature point to the camera (S22, not shown), determines feature points within a specified range of distance to be feature points to be processed (S23, not shown), and feature points outside the range are deemed inappropriate and excluded (S24, not shown). The image selection section 61 selects images having relatively many object feature points to be processed as the object images to be processed, and determines images having relatively few object feature points to be processed to be inappropriate and excludes them. Since the selection is done during tracking feature points, increase in the speed of feature point tracking process is required. Here, the determination by approximated distances may be combined with the determination explained with FIG. 8 in which displacement vector of each feature point is compared with the sense and magnitude of the gyroscope, feature points not falling within a specified range are deemed inappropriate and excluded. In that case, position accuracy is improved.

FIG. 20 is to explain a high speed feature point tracking process. As the displacement direction of the feature point is estimated from the displacement direction data of the inertia sensor, the feature point tracking section 4 searches, as shown for example in FIGS. 20(a) and 20(b), for the feature points P3 and P4, only in the left upward direction. As the displacement amount of the feature point is estimated from the displacement amount and speed of the inertia sensor, the feature point tracking section 4 searches, as shown for example in FIGS. 20(c) and 20(d), for the feature points P3 and P4, only within a specified searching width. Narrowing the search range in this way makes it possible to considerably reduce the time taken for the image processing, and select images and feature points in real time while feature points are being tracked.

Fifth Embodiment

The first embodiment is described as an example in which a positional relationship measurement section having an inertia sensor is mounted, together with a camera, on a vehicle. This embodiment is described as another example in which the camera is standing, the object to be photographed moves, and the positional relationship measurement section having an inertia sensor is mounted on the object to be photographed. This embodiment is otherwise similar to the first embodiment. Also in this embodiment, there may be a case where a moving object other than the intended object to be photographed intervenes between the photographing device and the intended object, or a case where the photographing device sways, in which case feature points can be tracked to obtain the 3D coordinates of feature points of the intended object in a moving image or photographed images that sequentially change gradually. In this case, the positional relationship measurement section 9 detects the direction and sense of moving objects to be photographed (such as cars, trains, and ships) and transmits detected data to the moving image process section 5. On the display screen are shown displacement vector of the photographed object together with the displacement direction (opposite the sense of gyroscope). In the moving image process section 5, using the images obtained with the image acquisition section 2 and the above-mentioned detected data, like the first embodiment, images and feature points are selected with the image-and-feature point selection section 6. The position measurement section 7 determines the position of the photographed object.

Sixth Embodiment

The first embodiment is described as an example in which a positional relationship measurement section having an inertia sensor is mounted, together with a camera, on a vehicle. In contrast, this embodiment is described as an example in which the camera moves together with the object to be photographed, and the positional relationship measurement sections having the inertia sensor are mounted on both the vehicle with a camera mounted and the object to be photographed. This embodiment is otherwise similar to the first embodiment.

Figure 21:
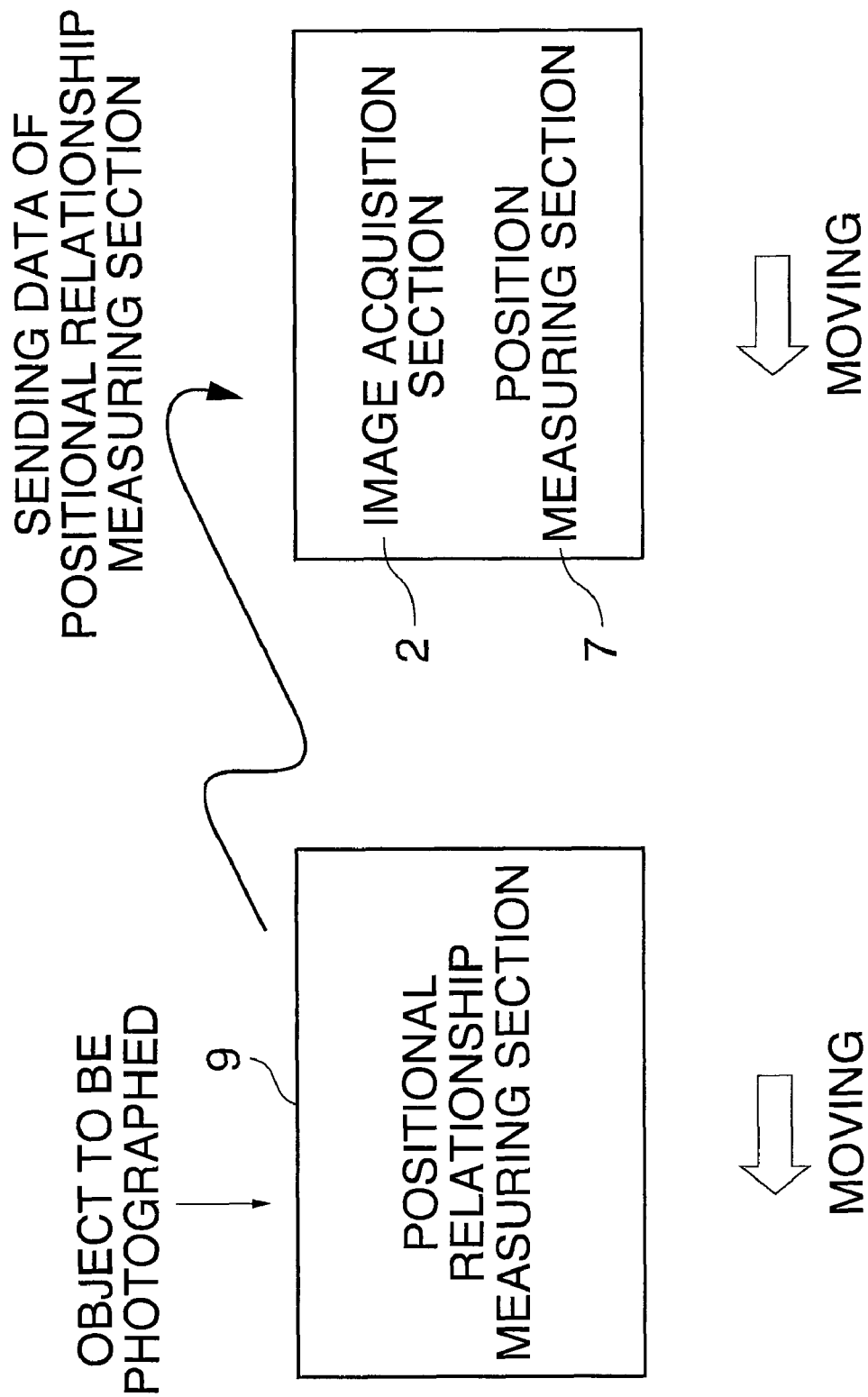
FIG. 21 is a drawing for explaining the concept of the sixth embodiment.

FIG. 21 is a view for explaining the concept of a sixth embodiment. The drawing shows a state in which the positional relationship measurement section 9 is mounted on the object to be photographed and on the vehicle on which the camera is mounted; the image acquisition section 2 having a camera and the position measurement section 7 are mounted on the vehicle, and both the object to be photographed and the camera move.

When both the components are moving, the positional relationship measurement section 9 detects direction and sense of the moving camera and object to be photographed, transmits the detected data to the moving image process section 5, and the display screen displays relative displacement vectors of camera and photographed object together with the displacement direction (opposite the sense of gyroscope) of both the camera and object to be photographed. In the moving image process section 5, using the images acquired with the image acquisition section 2 and the above-mentioned detected data, like the first embodiment, the image-and-feature point selection section 6 selects images and feature points, and the position measurement section 7 determines the photographing position and photographing posture of the image acquisition section 2 or the position of the photographed object. As a result of the process, relative positions of both the components and 3D coordinates of the moving, photographed object are determined. Here, it is also possible to discard motionless background and extract only photographed objects in motion, to determine 3D coordinates. If an absolute coordinates are transmitted from the side of the object to be photographed, the position in the absolute coordinate system of the moving body or the main part of the position measuring device is determined. Besides, the displacement direction (opposite the sense of gyroscope) may be one that indicates a relative displacement direction of the camera and photographed object.

The present invention can be implemented in the form of a computer program for causing a computer to perform the image processing method described in the above embodiments. The program may be used by being stored in an internal memory of the operating section 1, by being stored in a storage device internally or externally of the system, or by being downloaded via the Internet. The present invention may also be implemented as a storage medium storing the program.

The embodiments of the present invention have been described above. It should be understood that the present invention is not limited to the above embodiments, but various modifications may be made to the embodiments without departing from the scope of the present invention.

The above embodiments are described as examples that include each of photographed object and photographing device, however, this invention may be applied to a constitution with a plural number of them when they are divided into one-to-one sets. It is also possible to connect a plurality of photographed objects and a plurality of photographing devices like a chain. Although orthogonal coordinates are used for 3D coordinates in the embodiments, cylindrical or spherical coordinates may be used, depending on the relationship between the object to be photographed and the photographing device. Although a MORAVEC operator is used to extract feature points and SSDA template matching is used for the template matching in the embodiments, other operators and template matching methods may be used. The example of using the projective transformation to obtain the screen relative movement amount in the embodiments is described, however, other projective transformation such as affine transformation and Helmert transformation may be used.

The above embodiments are described as examples to carry out one or both of the image selecting process and the feature point selecting process, or to carry out them at different time points. However, it is also possible to carry out in combination with different time points. As a matter of course, either one process or both processes may be carried out. While the first embodiment is described as an example of combination of the flow of FIG. 7 and the flow of FIG. 9, an embodiment is also possible in which only one is carried out. Further, the first embodiment is described as an example of displaying the sense of the gyroscope on the screen, however, it is also possible not to display the sense of the gyroscope and to determine feature points, having the same direction and magnitude of displacement vector in the photographed image, to be the feature points to be processed. It is also possible not to carry out image selecting process and feature point selecting process, to compare information on the photographing position and photographing posture or information on the position of the photographed object measured with the position measurement section with information on the photographing position and photographing posture or information on the position of the photographed object obtained with the positional relationship measurement section, and to use measurement data obtained with the positional relationship measurement section for only correction. The first and fourth embodiments are described as examples in which first the feature points to be processed are selected according to the measurement data on direction and amount of displacement obtained with the positional relationship measurement section. In this case, however, first the images to be processed may be selected according to the measurement data on direction and amount of displacement obtained with the positional relationship measurement section. While the above embodiments are described as examples in which displacement direction and displacement amount out of the measurement data of the positional relationship measurement section are supplied to the moving image process, it is also possible to supply data on displacement speed and acceleration. Further, while the above embodiments are described as examples in which calculation of approximate feature point position is made at the moving image process section, it is also possible to make the calculation of approximate feature point position with the estimating section of the positional relationship measurement section using feature point data taken from the moving image process section and supply the calculation results to the moving image process section. Further, while the above embodiments are described as examples in which the image acquisition section typically takes photographed images from its own camera, it is also possible that a position measuring device located at a distance takes photographed images through communication from a vehicle-mounted camera. In addition, the displacement amount, range of displacement direction, the extent of change in a series of photographed images changing little by little, and the number of feature points to be extracted may be empirically determined differently.

The present invention is for use to measure the positional coordinates of a photographing device or an object to be photographed using moving images.

DESCRIPTION OF REFERENCE NUMERALS AND SYMBOLS 1 operating section
2 image acquisition section
3 feature extraction section
4 feature point tracking section
5 moving image process section
6 image-and-feature point selection section
7 position measurement section
8 comparing section
9 positional relationship measurement section
10 display section
11 corresponding point information memory
12 moving image memory
61 image selection section
62 feature point selection section
91 inertia sensor
92 estimating section
100 position measurement section

What is claimed is:

1. A position measuring device comprising:
an image acquisition section for acquiring a series of photographed images changing continuously or changing little by little along with position displacement relative to an object to be photographed;
a positional relationship measurement section for measuring position displacement and posture change of the image acquisition section;
a feature extraction section for extracting feature points from the photographed images obtained with the image acquisition section;
a feature point tracking section for tracking the feature points by searching corresponding points corresponding to the feature points on a plurality of the photographed images;
an image selection section for selecting an image to be precessed from the series of photographed images based on a measurement result made with the positional relationship measurement section; and
a position measurement section for measuring the photographing position and photographing posture of the image acquisition section or position of the photographed object based on the image to be processed selected with the image selection section.

2. The position measuring device of claim 1, wherein the image selection section selects the image to be processed based on the measurement data on the displacement direction and/or displacement amount obtained with the positional relationship measurement section.

3. The position measuring device of claim 2, wherein the image selection section selects the images to be processed between photographed image acquisition with the image acquisition section and feature point extraction with the feature extraction section.

4. The position measuring device of claim 1, wherein the positional relationship measurement section includes a gyroscope, an accelerometer, and a geomagnetism sensor.

5. The position measuring device of claim 1, wherein the feature point tracking section, when tracking feature points, is capable of changing search width direction or search width size.

6. The position measuring device of claim 1, comprising a display section for displaying on a screen displacement direction and displacement speed of feature points on the photographed image from a result of tracking made with the feature point tracking section.

7. The position measuring device of claim 1, comprising a comparing section for comparing the information on the photographing position and photographing posture measured with the position measurement section with the information on the photographing position and photographing posture obtained with the positional relationship measurement section, or for comparing the information on the position of the photographed object measured with the position measurement section with the information on the position of the photographed object obtained with the positional relationship measurement section.

8. A position measuring device comprising:
an image acquisition section for acquiring a series of photographed images changing continuously or changing little by little along with position displacement relative to an object to be photographed;
a positional relationship measurement section for measuring displacement and posture change of the image acquisition section;
a feature extraction section for extracting feature points from the photographed images obtained with the image acquisition section;
a feature point tracking section for tracking the feature points by searching corresponding points corresponding to the feature points on a plurality of the photographed images;
a feature point selection section for selecting feature points to be processed from the feature points extracted from the photographed images based on a measurement result made with the positional relationship measurement section; and
a position measurement section for measuring the photographing position and photographing posture of the image acquisition section or position of the photographed object based on the image to be processed selected with the image selection section.

9. The position measuring device of claim 8, wherein the feature point selection section selects feature points, with their displacement direction and displacement amount obtained from tracking data with the feature point tracking section falling within a specified range including the displacement direction and displacement amount obtained with the positional relationship measurement section, as the object points to be processed.

10. The position measuring device of claim 9, comprising an image selection section for selecting images to be processed from the series of photographed images based on a measurement result made with the positional relationship measurement section, wherein the image selection section selects an image having relatively many feature points to be processed, as the image to be processed.

11. The position measuring device of claim 9, wherein the feature point selection section selects the feature points to be processed during feature point tracking with the feature point tracking section, or between feature point tracking with the feature point tracking section and position measurement with the position measurement section.

12. The position measuring device of claim 8, wherein the feature point selection section selects feature points, with the approximate distance between the image acquisition section and the feature point determined from measurement data obtained with the positional relationship measurement section falling within a specified range, as the feature points to be processed.

13. The position measuring device of claim 12, comprising an image selection section for selecting images to be processed from the series of photographed images based on a measurement result made with the positional relationship measurement section, wherein the image selection section selects an image having relatively many feature points to be processed, as the image to be processed.

14. The position measuring device of claim 12, wherein the feature point selection section selects the feature points to be processed either during feature point tracking with the feature point tracking section, between feature point extraction with the feature extraction section and feature point tracking with the feature point tracking section, or between feature point tracking with the feature point tracking section and position measurement with the position measurement section.

15. The position measuring device of claim 8, wherein the positional relationship measurement section includes a gyroscope, an accelerometer, and a geomagnetism sensor.

16. The position measuring device of claim 8, wherein the feature point tracking section, when tracking feature points, is capable of changing search width direction or search width size.

17. The position measuring device of claim 8, comprising a display section for displaying on a screen displacement direction and displacement speed of feature points on the photographed image from a result of tracking made with the feature point tracking section.

18. The position measuring device of claim 8, comprising a comparing section for comparing the information on the photographing position and photographing posture measured with the position measurement section with the information on the photographing position and photographing posture obtained with the positional relationship measurement section, or for comparing the information on the position of the photographed object measured with the position measurement section with the information on the position of the photographed object obtained with the positional relationship measurement section.

19. A position measuring device comprising:
an image acquisition section for acquiring a series of photographed images changing continuously or changing little by little along with position displacement relative to an object to be photographed;
a positional relationship measurement section for measuring position displacement and posture change of the object to be photographed;
a feature extraction section for extracting feature points from the photographed images obtained with the image acquisition section;
a feature point tracking section for tracking the feature points by searching corresponding points corresponding to the feature points on a plurality of the photographed images;
an image selection section for selecting an image to be processed from the series of photographed images based on a measurement result made with the positional relationship measurement section; and
a position measurement section for measuring the photographing position and photographing posture of the image acquisition section or position of the photographed object based on the image to be processed selected with the image selection section.

20. The position measuring device of claim 19, wherein the image selection section selects the image to be processed based on the measurement data on the displacement direction and/or displacement amount obtained with the positional relationship measurement section.

21. The position measuring device of claim 20, wherein the image selection section selects the images to be processed between photographed image acquisition with the image acquisition section and feature point extraction with the feature extraction section.

22. The position measuring device of claim 19, wherein the positional relationship measurement section includes a gyroscope, an accelerometer, and a geomagnetism sensor.

23. The position measuring device of claim 19, wherein the feature point tracking section, when tracking feature points, is capable of changing search width direction or search width size.

24. The position measuring device of claim 19, comprising a display section for displaying on a screen displacement direction and displacement speed of feature points on the photographed image from a result of tracking made with the feature point tracking section.

25. The position measuring device of claim 19, comprising a comparing section for comparing the information on the photographing position and photographing posture measured with the position measurement section with the information on the photographing position and photographing posture obtained with the positional relationship measurement section, or for comparing the information on the position of the photographed object measured with the position measurement section with the information on the position of the photographed object obtained with the positional relationship measurement section.

26. A position measuring device comprising:
an image acquisition section for acquiring a series of photographed images changing continuously or changing little by little along with position displacement relative to an object to be photographed;
a positional relationship measurement section for measuring position displacement and posture change of the object to be photographed;
a feature extraction section for extracting feature points from the photographed images obtained with the image acquisition section;

a feature point tracking section for tracking the feature points by searching corresponding points corresponding to the feature points on a plurality of the photographed images;

a feature point selection section for selecting processing feature point to be processed from the photographed images based on a measurement result made with the positional relationship measurement section; and a position measurement section for measuring the photographing position and photographing posture of the image acquisition section or position of the photographed object based on the feature point to be processed selected with the feature point selection section.

27. The position measuring device of claim 26, wherein the feature point selection section selects feature points, with their displacement direction and displacement amount obtained from tracking data with the feature point tracking section falling within a specified range including the displacement direction and displacement amount obtained with the positional relationship measurement section, as the object points to be processed.

28. The position measuring device of claim 27, comprising an image selection section for selecting images to be processed from the series of photographed images based on a measurement result made with the positional relationship measurement section, wherein the image selection section selects an image having relatively many feature points to be processed, as the image to be processed.

29. The position measuring device of claim 27, wherein the feature point selection section selects the feature points to be processed during feature point tracking with the feature point tracking section, or between feature point tracking with the feature point tracking section and position measurement with the position measurement section.

30. The position measuring device of claim 26, wherein the feature point selection section selects feature points, with the approximate distance between the image acquisition section and the feature point determined from measurement data obtained with the positional relationship measurement section falling within a specified range, as the feature points to be processed.

31. The position measuring device of claim 30, comprising an image selection section for selecting images to be processed from the series of photographed images based on a measurement result made with the positional relationship measurement section, wherein the image selection section selects an image having relatively many feature points to be processed, as the image to be processed.

32. The position measuring device of claim 30, wherein the feature point selection section selects the feature points to be processed either during feature point tracking with the feature point tracking section, between feature point extraction with the feature extraction section and feature point tracking with the feature point tracking section, or between feature point tracking with the feature point tracking section and position measurement with the position measurement section.

33. The position measuring device of claim 26, wherein the positional relationship measurement section includes a gyroscope, an accelerometer, and a geomagnetism sensor.

34. The position measuring device of claim 26, wherein the feature point tracking section, when tracking feature points, is capable of changing search width direction or search width size.

35. The position measuring device of claim 26, comprising a display section for displaying on a screen displacement direction and displacement speed of feature points on the photographed image from a result of tracking made with the feature point tracking section.

36. The position measuring device of claim 26, comprising a comparing section for comparing the information on the photographing position and photographing posture measured with the position measurement section with the information on the photographing position and photographing posture obtained with the positional relationship measurement section, or for comparing the information on the position of the photographed object measured with the position measurement section with the information on the position of the photographed object obtained with the positional relationship measurement section.

37. A position measuring method comprising:

An image acquisition step, with an image acquisition section, of acquiring a series of photographed images changing continuously or changing little by little along with position displacement relative to an object to be photographed;

a positional relationship measurement step of measuring position displacement and posture change of the image acquisition section;

a feature extracting step of extracting feature points from photographed images obtained in the image acquisition step;

a feature point tracking step of tracking the feature points by searching corresponding points corresponding to the feature points on a plurality of the photographed images;

an image selection step of selecting images to be processed from the series of photographed images based on a measurement result made with the positional relationship measurement step; and a position measurement step of measuring the photographing position and photographing posture of the image acquisition section or position of the photographed object based on the images to be processed selected in the image selection step.

38. A position measuring method comprising:

an image acquisition step, with an image acquisition section, of acquiring a series of photographed images changing continuously or little by little along with position displacement relative to an object to be photographed;

a positional relationship measurement step of measuring position displacement and posture change of the image acquisition section;

a feature extraction step of extracting feature points from photographed images obtained in the image acquisition step;

a feature point tracking step of tracking the feature points by searching corresponding points corresponding to the feature points on a plurality of the photographed images;

a feature point selection step of selecting feature points to be processed from the feature points extracted from the photographed images based on a measurement result made in the positional relationship measurement step; and a position measurement step of measuring the photographing position and photographing posture of the image acquisition section based on the feature points to be processed selected in the feature point selection step.

39. A position measuring method comprising:

an image acquisition step of acquiring a series of photographed images changing continuously or little by little along with position displacement relative to an object to be photographed;

a positional relationship measurement step of measuring position displacement and posture change of the object to be photographed;

a feature extraction step of extracting feature points from the photographed images obtained in the image acquisition step;

a feature point tracking step of tracking the feature points by searching corresponding points corresponding to the feature points on a plurality of the photographed images;

an image selection step of selecting images to be processed from the series of photographed images based on a measurement result made in the positional relationship measurement step; and a position measurement step of measuring the photographing position and the photographing posture of the image acquisition section or the position of the photographed object based on the images to be processed selected in the image selection step.

40. A position measuring method comprising:

an image acquisition step of acquiring a series of photographed images changing continuously or little by little along with position displacement relative to an object to be photographed;

a positional relationship measurement step of measuring position displacement and posture change of the object to be photographed;

a feature extraction step of extracting feature points from the photographed images obtained in the image acquisition step;

a feature point tracking step of tracking the feature points by searching corresponding points corresponding to the features points on a plurality of the photographed images;

a feature point selection step of selecting feature points to be processed from the feature points extracted from the photographed images based on a measurement result made in the positional relationship measurement step; and a position measurement step of measuring the photographing position and photographing posture of the image acquisition section or the position of the photographed object based on the feature points to be processed selected in the feature point selection step.

* * * * *